(12) United States Patent
Sadahira et al.

(10) Patent No.: US 8,265,780 B2
(45) Date of Patent: Sep. 11, 2012

(54) DETERMINATION OF PERFORMANCE OF APPARATUS AND NETWORK SETTING

(75) Inventors: Masafumi Sadahira, Osaka (JP); Atusi Nakayama, Nara (JP); Yoshiaki Watanabe, Nara (JP); Takaaki Okude, Nara (JP); Yasuo Yoshimura, Nara (JP)

(73) Assignee: Panasonic Corporation, Osaka (JP)

(*) Notice: Subject to any disclaimer, the term of this patent is extended or adjusted under 35 U.S.C. 154(b) by 951 days.

(21) Appl. No.: 10/590,359

(22) PCT Filed: Feb. 22, 2005

(86) PCT No.: PCT/JP2005/002768
§ 371 (c)(1),
(2), (4) Date: May 17, 2007

(87) PCT Pub. No.: WO2005/080884
PCT Pub. Date: Sep. 1, 2005

(65) Prior Publication Data
US 2008/0221713 A1  Sep. 11, 2008

(30) Foreign Application Priority Data

Feb. 24, 2004  (JP) .................................. 2004-047275

(51) Int. Cl.
*G05B 15/00* (2006.01)
(52) U.S. Cl. ................ 700/83; 700/1; 709/224
(58) Field of Classification Search ........... 700/1, 81, 700/83; 714/4, 4.1; 709/224
See application file for complete search history.

(56) References Cited

U.S. PATENT DOCUMENTS

| 7,464,157 B2 * | 12/2008 | Okude et al. ............. 709/224 |
| 2002/0180579 A1 * | 12/2002 | Nagaoka et al. ............ 340/3.1 |
| 2005/0015644 A1 * | 1/2005 | Chu et al. .................... 714/4 |

FOREIGN PATENT DOCUMENTS

| JP | 2002-176681 | 6/2002 |
| JP | 2002-297702 | 10/2002 |
| JP | 2004-28459 | 1/2004 |
| JP | 2004-356696 | * 12/2004 |

* cited by examiner

*Primary Examiner* — Sean Shechtman
*Assistant Examiner* — Steven Garland
(74) *Attorney, Agent, or Firm* — Wenderoth Lind & Ponack, L.L.P.

(57) ABSTRACT

An apparatus control system. apparatus and computer-readable recording medium for enabling different operators to perform apparatus and network settings independently and to easily confirm a setting status. An apparatus setter at least one of a setting on a connection between a water heater and a remote controller, and a test run of the water heater using the remote controller. A network setter performs setting on a connection between the remote controller and a server. A setting status monitoring section monitors an apparatus setting status representing whether or not the setting by the apparatus setter is ended and a network setting status representing whether or not the setting by the network setter is ended. A setting status display controlling section displays the apparatus setting status and the network setting status.

9 Claims, 17 Drawing Sheets

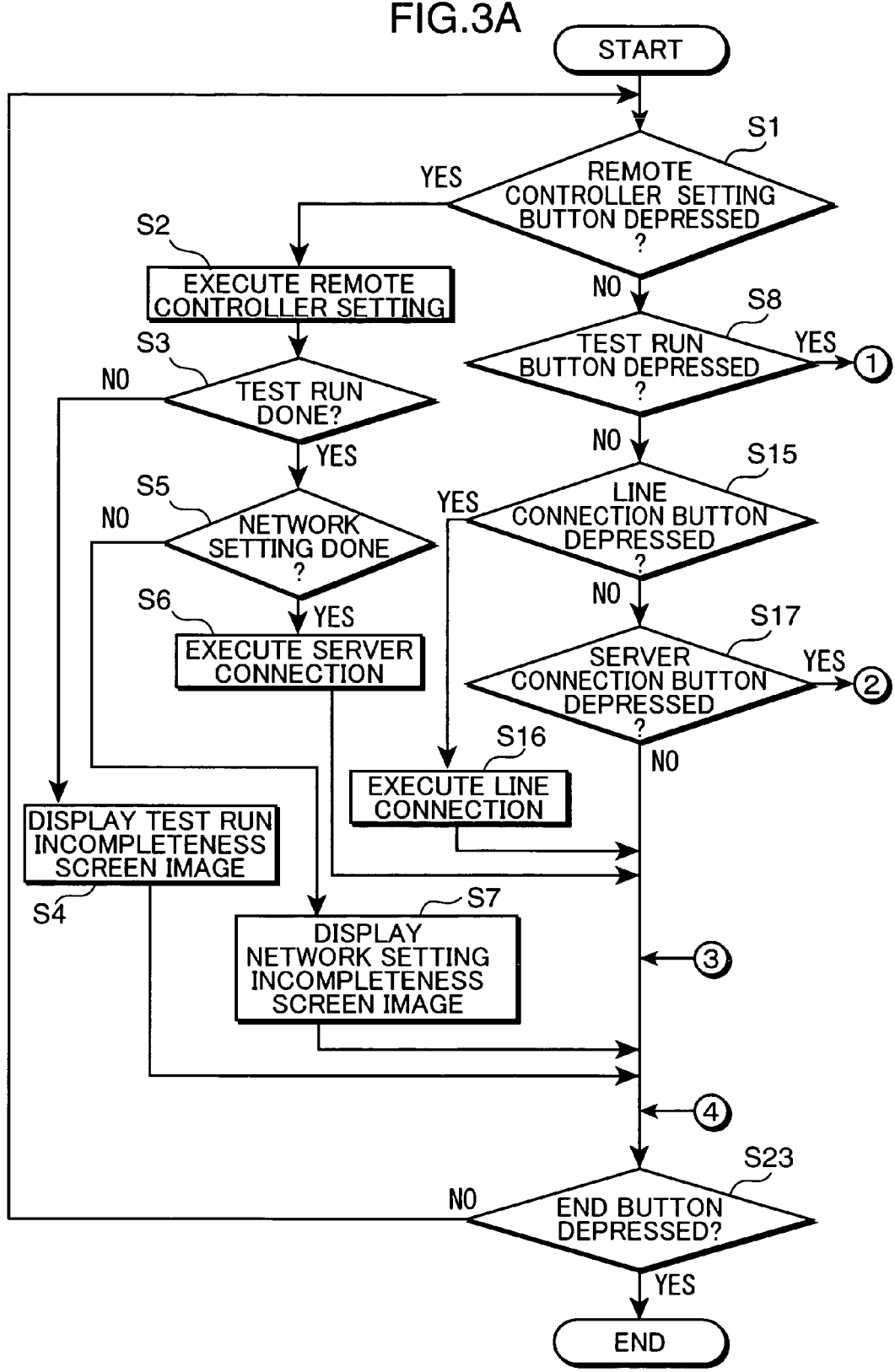

DETERMINATION OF PERFORMANCE OF APPARATUS AND NETWORK SETTING

BACKGROUND OF THE INVENTION

1. Technical Field

The present invention relates to an apparatus control system provided with a function of connecting, via a network, a water heater (called as "apparatus") such as an electric-power-controlled gas-fired water heater, an oil-fired water heater, an electric water heater, or a heat pump water heater, to a server, as well as an apparatus, and a computer-readable recording medium recorded with an apparatus control program.

2. Background Art

An example (e.g. see Japanese Unexamined Patent Publication No. 2002-176681) of a conventional remote control system (apparatus control system) is described referring to FIG. 15. In FIG. 15, the remote control system includes a bath 801, a water heater 802, a remote controller 803, and a server 804. The remote controller 803 communicates with the water heater 802 to control operations of the bath 801 and the water heater 802. Also, the server 804 communicates with the remote controller 803 via a telephone line network 805 to control the remote controller 803 or to acquire status data concerning the water heater 802 under the control of the remote controller 803.

The conventional remote control system has the following drawbacks, which are not recited in the publication.

Specifically, the water heater is connected to the bath and various hot water taps or faucets. The plumbing layout differs depending on a layout of a house where the water heater is installed. Accordingly, installation of a water heater involves a work concerning thereto. Also, an apartment building equipped with an internet accessibility has been recently spread. In such an apartment building, a work of installing network-related devices such as a hub or a router for use in physically connecting the remote controller to a server, is required.

Whether or not the work relating to the installation of the water heater or the work relating to the network connection is ended first is unknown. Accordingly, it is extremely difficult to fix the order of the works. After the work relating to the installation of the water heater and the work relating to the network connection are ended, an operation relating to network setting and an operation relating to apparatus setting are necessary to remote-controllably use the apparatus installed by these works.

For instance, the network setting includes selection of an IP address assignment method, subnet mask setting, DNS setting, and access point URL list setting. The apparatus setting includes: confirmation as to whether the apparatus connected to the remote controller is normally operated; confirmation as to whether a command displayed on a screen of the remote-controller corresponds to the actual operation of the apparatus; confirmation as to whether the apparatus is operated in accordance with the command; and adjustment.

As mentioned above, the network setting and the water heater setting are different in expertise for work and/or setting, which may likely to involve respective setting operations by different workers or operators. In view of this, there is a demand for a function of letting the operators easily recognize an ongoing setting status, as well as a function of allowing the operators to perform the setting operations independently, and a function of notifying the server of completion of the respective setting operations upon the completion.

In the conventional art, the server has been notified merely of completion of the network-connection related work and the network setting. There has been no way of confirming whether the water heater installation work and the water heater setting have been completed. In a worse case, the operator may overlook that the water heater installation work and/or the water heater setting has been undone or has not been completed.

SUMMARY OF THE INVENTION

In view of the problems residing in the prior art, it is an object of the invention to provide an apparatus control system that enables different operators to perform an apparatus setting and a network setting independently and efficiently and to easily confirm setting statuses on the apparatus setting and the network setting, as well as an apparatus, and a computer-readable recording medium recorded with an apparatus control program.

An apparatus control system according to an aspect of the invention is an apparatus control system provided with an apparatus which requires a plurality of different settings, an apparatus controlling device for controlling the apparatus, and a server which is communicatively connected to the apparatus controlling device via a network. The apparatus controlling device includes: an apparatus setting section for accepting an input by first operator, and performing a setting, the setting being at least one of a setting on a connection between the apparatus and the apparatus controlling device, and a confirmation on an operation of the apparatus including a test run of the apparatus using the apparatus controlling device; a network setting section for accepting an input by a second operator different from the first operator, and performing a setting on a connection between the apparatus controlling device and the server; a setting status monitoring section for monitoring an apparatus setting status representing whether the setting by the apparatus setting section has been completed, and a network setting status representing whether the setting by the network setting section has been completed; and a setting status display section for displaying the apparatus setting status and the network setting status detected by the setting status monitoring section.

According to the above arrangement, the apparatus setting section accepts an input by a first operator, and performs at least one of the connection setting between the apparatus and the apparatus controlling device, and the operation confirmation including the test run of the apparatus using the apparatus controlling device, and the network setting section accepts an input by a second operator different from the first operator, and performs the connection setting between the apparatus controlling device and the server. The setting status monitoring section monitors the apparatus setting status representing whether the setting by the apparatus setting section has been completed, and the network setting status representing whether the setting by the network setting section has been completed. The setting status display section displays the apparatus setting status and the network setting status detected by the setting status monitoring section.

In this arrangement, if the apparatus setting and the network setting are performed by different operators, the setting statuses as to whether the settings to be executed by the respective operators have been completed are displayed, which allows the respective operators to perform the setting operations independently and efficiently.

These and other objects, features and advantages of the present invention will become more apparent upon reading of the following detailed description along with the accompanying drawings.

BRIEF DESCRIPTION OF THE DRAWINGS

FIGS. 3A and 3B are flowcharts showing an example of a setting operation to be executed by the remote control system in the first embodiment of the invention.

DETAILED DESCRIPTION OF THE INVENTION

Figure 1:
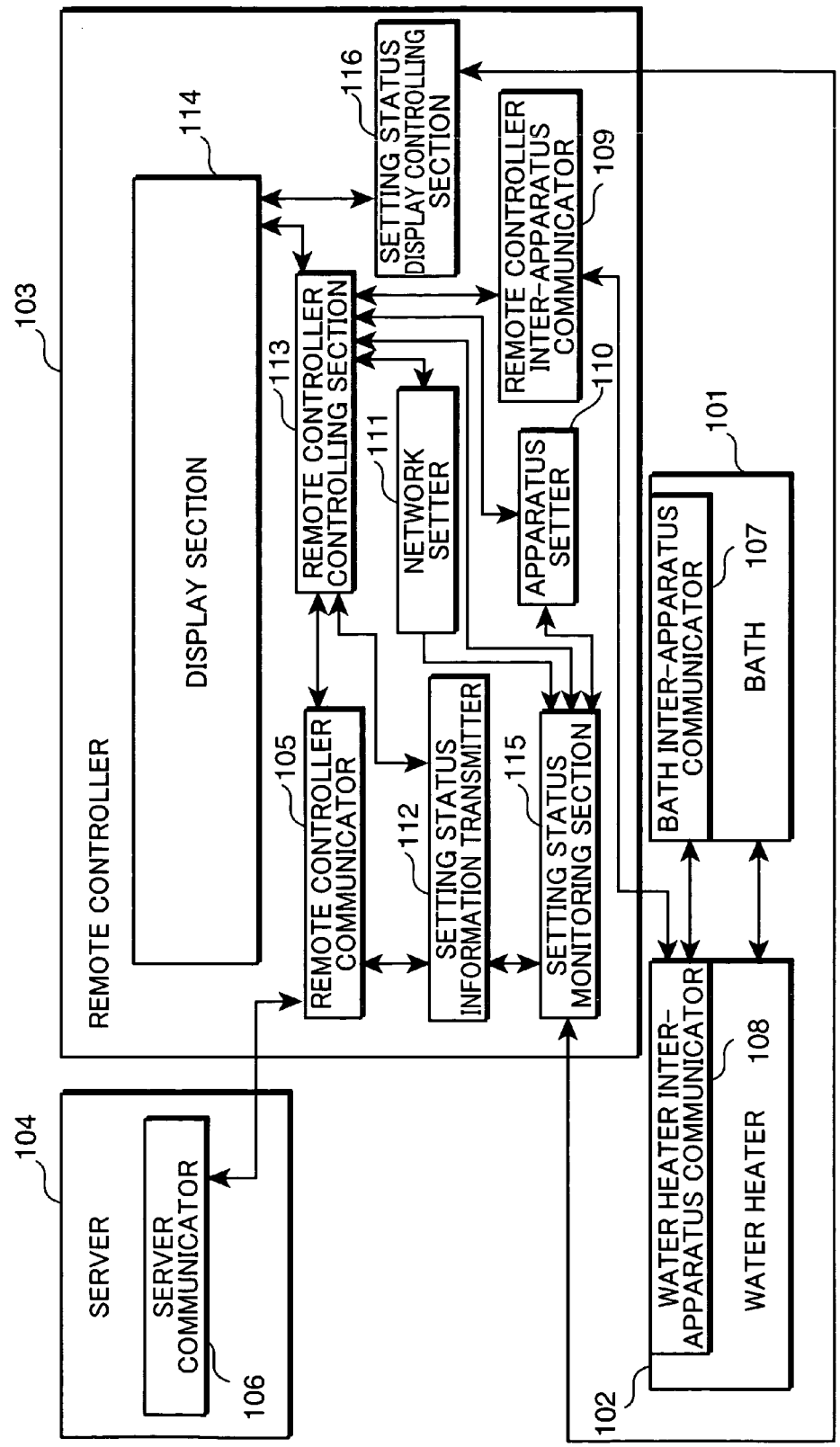
FIG. 1 is a block diagram showing a configuration of a remote control system in a first embodiment of the invention.

In the following, embodiments of the invention will be described referring to the drawings. It should be understood that the invention is not limited to the embodiments.

(First Embodiment)

FIG. 1 is a block diagram showing an example of a remote control system in a first embodiment of the invention. Referring to FIG. 1, the remote control system includes a bath 101, a water heater 102, a remote controller 103, and a server 104.

The bath 101 has a bath inter-apparatus communicator 107. The bath inter-apparatus communicator 107 sends data to the water heater 102, and receives data from the water heater 102. The water heater 102 has a water heater inter-apparatus communicator 108. The water heater inter-apparatus communicator 108 sends data to the bath 101, receives data from the bath 101, sends data to the remote controller 103, and receives data from the remote controller 103. The server 104 has a server communicator 106. The server communicator 106 sends data to the remote controller 103 and receives data from the remote controller 103.

The remote controller 103 includes a remote controller communicator 105, a remote controller inter-apparatus communicator 109, an apparatus setter 110, a network setter 111, a setting status information transmitter 112, a remote controller controlling section 113, a display section 114, a setting status monitoring section 115, and a setting status display controlling section 116.

The remote controller communicator 105 sends data to the server 104, and receives data from the server 104. The remote controller inter-apparatus communicator 109 sends data to the water heater 102, and receives data from the water heater 102. The apparatus setter 110 performs at least one of a setting regarding connection between the water heater 102 and the remote controller 103, and a test run of the water heater 102 using the remote controller 103. The network setter 111 performs a setting regarding connection between the remote controller 103 and the server 104.

The apparatus in the specification includes: a water heater for which an installation work is necessary; facility equipment such as a security system and a door phone; and household electric appliances such as an air conditioner, a refrigerator, and a washing machine. Also, an operator who performs network setting, and an operator who performs a setting regarding an operation of the apparatus itself are different, and the apparatus setting does not include the network setting.

The apparatus setter 110 performs a connection setting so that a control signal for controlling the water heater 102 is transmittable, and a response signal to be sent from the water heater 102 is receivable. The connection setting is an operation of connecting the water heater 102 and the remote controller 103 by an electric work so that the water heater 102 is electrically and communicatively connected to the remote controller 103.

The network setter 111 performs a connection setting so that the server 104 is identified on the network, and the identified server 104 is communicatively connected to the remote controller 103. The connection setting is an operation of communicatively connecting the server 104 to the remote controller 103 in a software manner, using an input means (touch panel function of the display section 114) of the remote controller 103.

The setting status information transmitter 112 sends information relating to a setting status defined by the apparatus setter 110 from the server 104 to the remote controller communicator 105, based on information detected by the setting status monitoring section 115. The remote controller controlling section 113 centrally controls overall operations of the remote controller 103 by executing a control program prestored in the remote controller controlling section 113.

The setting status monitoring section 115 monitors both an apparatus setting status representing whether the setting by the apparatus setter 110 has been completed, and a network setting status representing whether the setting by the network setter 111 has been completed. The setting status monitoring section 115 detects a current apparatus setting status and a current network setting status in response to a command from the remote controller controlling section 113, and outputs a detection result to the remote controller controlling section 113.

The setting status display controlling section 116 causes the display section 114 to display the apparatus setting status and the network setting status, which are detected by the setting status monitoring section 115. The display section 114 displays a setting screen i.e. a screen image showing acceptance of a setting by a user, a setting status between the apparatus 102 and the remote controller 103, a setting status between the remote controller 103 and the server 104, and the like.

The water heater 102 includes a gas-fired appliance, for instance. The server 104 includes a work station, for instance. The remote controller communicator 105 and the server communicator 106 includes a LAN card capable of TCP/IP communication via the Internet or a like device, for instance. The bath inter-apparatus communicator 107, the water heater inter-apparatus communicator 108, and the remote controller inter-apparatus communicator 109 include a serial communication means, for instance. The apparatus setter 110, the network setter 111, the setting status information transmitter 112, the remote controller controlling section 113, the setting status monitoring section 115, and the setting status display controlling section 116 includes a microcomputer, for instance. The display section 114 include a touch panel which allows various information display for the user, and accepts operation designation by the user.

The water heater 102 is connectable, in addition to the bath 101, to a hot-water floor heating device for heating a floor, or a bathroom dryer, using heated water generated in the hot water faucets or the water heater 102. Examples of the water heater 102 are an electric-power-controlled gas-fired water heater, an oil-fired water heater, an electric water heater, and a heat pump water heater.

In the embodiment, the remote control system corresponds to an example of an apparatus control system; the water heater 102 corresponds to an example of an apparatus; the remote controller 103 corresponds to an example of an apparatus controlling device; the apparatus setter 110 corresponds to an example of an apparatus setting section; the network setter 111 corresponds to an example of a network setting section; the setting status monitoring section 115 corresponds to an example of a setting status monitoring section; the display section 114 and the setting status display controlling section 116 correspond to an example of a setting status display section; the remote controller communicator 105 and the setting status information transmitter 112 correspond to an example of a setting status information transmitting section; and the server communicator 106 corresponds to an example of a setting status information receiving section.

In the following, an operation and a process of the remote control system having the above configuration will be described.

First, the server 104 is activated to start an operation of the remote control system. After the remote controller 103 is installed, and an operation of the remote controller 103 is started, the remote controller controlling section 113 controls the display section 114 to display an operation panel of the bath 101, and interface buttons for allowing apparatus connection and network setting based on a program stored in the remote controller controlling section 113. When the user depresses an intended button displayed on the display section 114, the remote controller controlling section 113 starts controlling a relevant section in association with the depressed button to perform an operation assigned to the relevant section.

Figure 2:
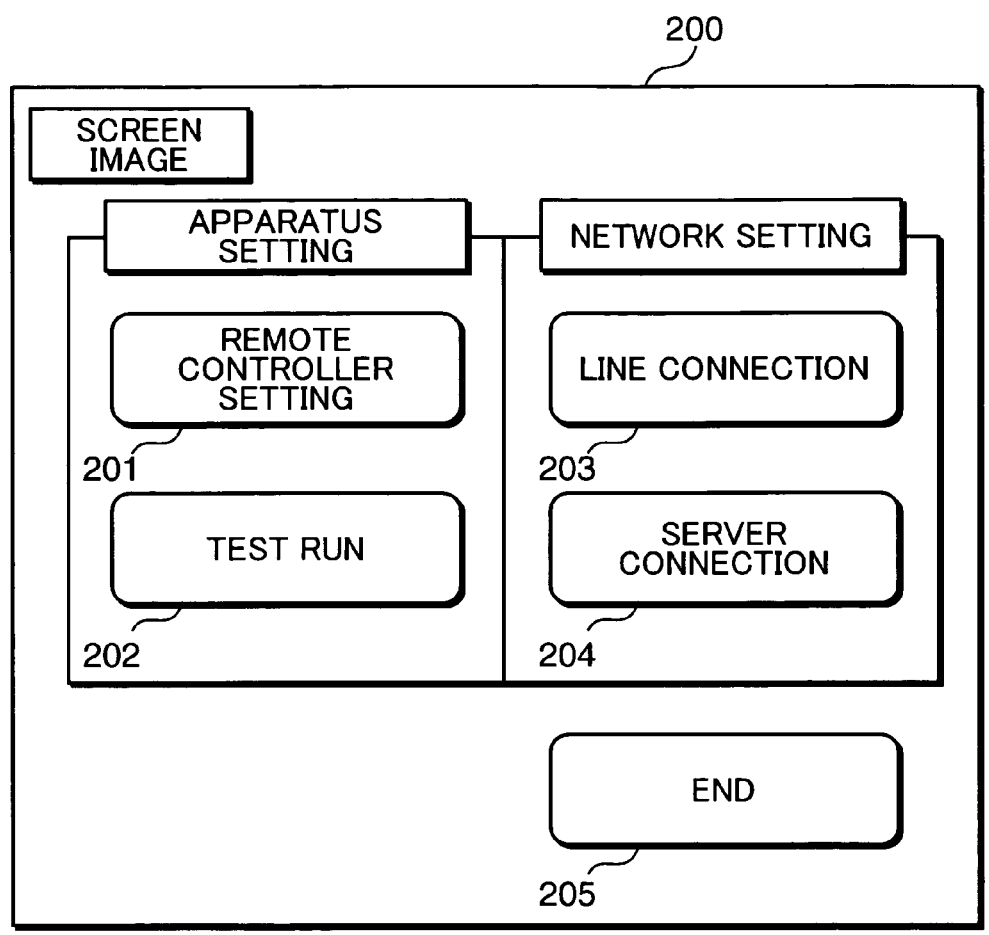
FIG. 2 is a diagram showing an example of a screen image of the remote control system in the first embodiment of the invention.

For activation of the remote control system, the apparatus setting and the network setting are required. FIG. 2 is a diagram showing an example of a screen image to be displayed on the display section 114 in the first embodiment. Referring to FIG. 2, the screen image 200 includes a remote controller setting button 201, a test run button 202, a line connection button 203, a server connection button 204, and an end button 205. The remote controller setting button 201 and the test run button 202 are buttons relating to the apparatus setting. The line connection button 203 and the server connection button 204 are buttons relating to the network setting. Upon completion of the operations designated by the respective buttons, information relating to the setting statuses of the apparatus setting and the network setting is stored in the setting status monitoring section 115.

When the user depresses the remote controller setting button 201, the remote controller controlling section 113 performs connection setting between the bath 101 and the water heater 102, and between the water heater 102 and the remote controller 103, for instance, interface setting to display information relating to an operation of the bath 101 on the screen of the remote controller 103, using the apparatus setter 110 (remote controller setting process). When the user depresses the test run button 202, the remote controller controlling section 113 controls the bath 101 for which the interface setting has been established to perform a test run, using the apparatus setter 110 and the remote controller inter-apparatus communicator 109 (test run process). In the embodiment, the remote controller setting process is an example of the connection setting, and the test run process is an example of a confirmation on the operation of the water heater 102 using the remote controller 103. Alternatively, the operation of the water heater 102 using the remote controller 103 may be confirmed by a process other than the test run process.

When the user depresses the line connection button 203, the remote controller controlling section 113 performs a setting as to whether the IP address is assigned by a fixed IP or a dynamic host configuration protocol (DHCP), subnet mask setting, domain name system (DNS) setting, and gateway setting, using the network setter 111.

When the user depresses the server connection button 204, the remote controller controlling section 113 controls the setting information monitoring section 115 to confirm that a necessary setting has been completed, using the setting status information transmitter 112. Thereafter, the remote controller controlling section 113 allows connection of the remote controller 103 to the server 104 via the remote controller communicator 105 and the server communicator 106. At this stage, the network address of the remote controller 103 and information relating to the connected apparatus are uploaded to the server 104, and information relating to an operation of the apparatus is downloaded from the server 104. Failure diagnosis of the apparatus, remote controllability of the apparatus, and information provision to the user via the remote controller 103 are performed based on the information communicated between the remote controller 103 and the server 104. When the user depresses the end button 205, the remote controller controlling section 113 terminates the display of the screen image 200.

Figure 3B:
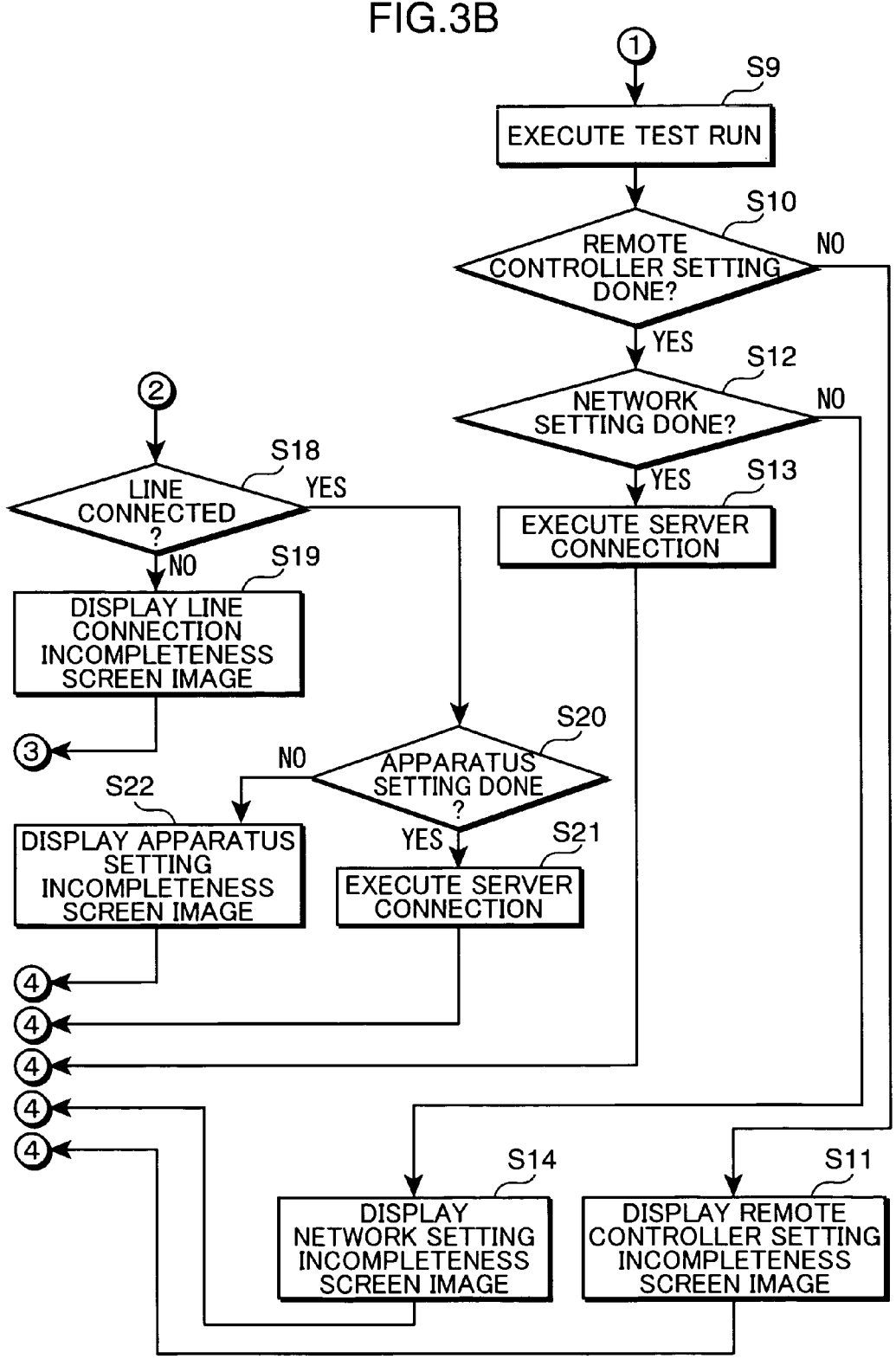

FIGS. 3A and 3B are flowcharts showing an example of a setting operation in the first embodiment of the invention. FIGS. 3A and 3B show an operation in the case where the remote controller controlling section 113 controls the display section 114 to display the screen image 200. In the following, the operation is described referring to the flowchart, when needed.

First, the remote controller controlling section 113 judges whether the remote controller setting button 201 on the screen image 200 displayed on the display section 114 has been depressed (Step S1). If the remote controller controlling section 113 judges that the remote controller setting button 201 has been depressed (YES in Step S1), the routine proceeds to a remote controller setting process in Step S2.

If, on the other hand, the remote controller controlling section 113 judges that the remote controller setting button 201 has not been depressed (NO in Step S1), the remote controller controlling section 113 judges whether the test run button 202 on the screen image 200 displayed on the display section 114 has been depressed (Step S8). If the remote controller controlling section 113 judges that the test run button 202 has been depressed (YES in Step S8), the routine proceeds to a test run process in Step S9.

If, on the other hand, the remote controller controlling section 113 judges that the test run button 202 has not been depressed (NO in Step S8), the remote controller controlling section 113 judges whether the line connection button 203 on the screen image 200 displayed on the display section 114 has been depressed (Step S15). If the remote controller controlling section 113 judges that the line connection button 203 has been depressed (YES in Step S15), the routine proceeds to a line connection process in Step S16.

If, on the other hand, the remote controller controlling section 113 judges that the line connection button 203 has not been depressed (NO in Step S15), the remote controller controlling section 113 judges whether the server connection button 204 on the screen image 200 displayed on the display section 114 has been depressed (Step S17). If the remote controller controlling section 113 judges that the server connection button 204 has been depressed (YES in Step S17), the routine proceeds to a process in Step S18.

If the remote controller controlling section 113 judges that the server connection button 204 has not been depressed (NO in Step S17), the remote controller controlling section 113 judges whether the end button 205 on the screen image 200 displayed on the display section 114 has been depressed (Step S23). If the remote controller controlling section 113 judges that the end button 205 has been depressed (YES in Step S23), the remote controller controlling section 113 terminates the display of the screen image 200. If, on the other hand, the remote controller controlling section 113 judges that the end button 205 has not been depressed (NO in Step S23), the routine returns to the process in Step S1.

In this embodiment, there are cases: (1) an operator in charge of network connection setting performs the network setting prior to completion of all the connection works between the bath 101 and the water heater 102, and between the water heater 102 and the remote controller 103; and (2) an operator in charge of apparatus setting performs the apparatus setting prior to completion of the network setting by the network connection setting operator.

In the case (1) that the network connection setting operator performs the network setting prior to completion of all the connection works between the bath 101 and the water heater 102, and between the water heater 102 and the remote controller 103, network setting between the water heater 102 and the remote controller 103 is executed. Specifically, the remote controller controlling section 113 accepts depressing of the line connection button 203 (Step S15) and depressing of the server connection button 204 (Step S17) by the network connection setting operator. Thereby, the network connection setting operator is allowed to perform the network setting prior to the apparatus setting.

Figure 4:
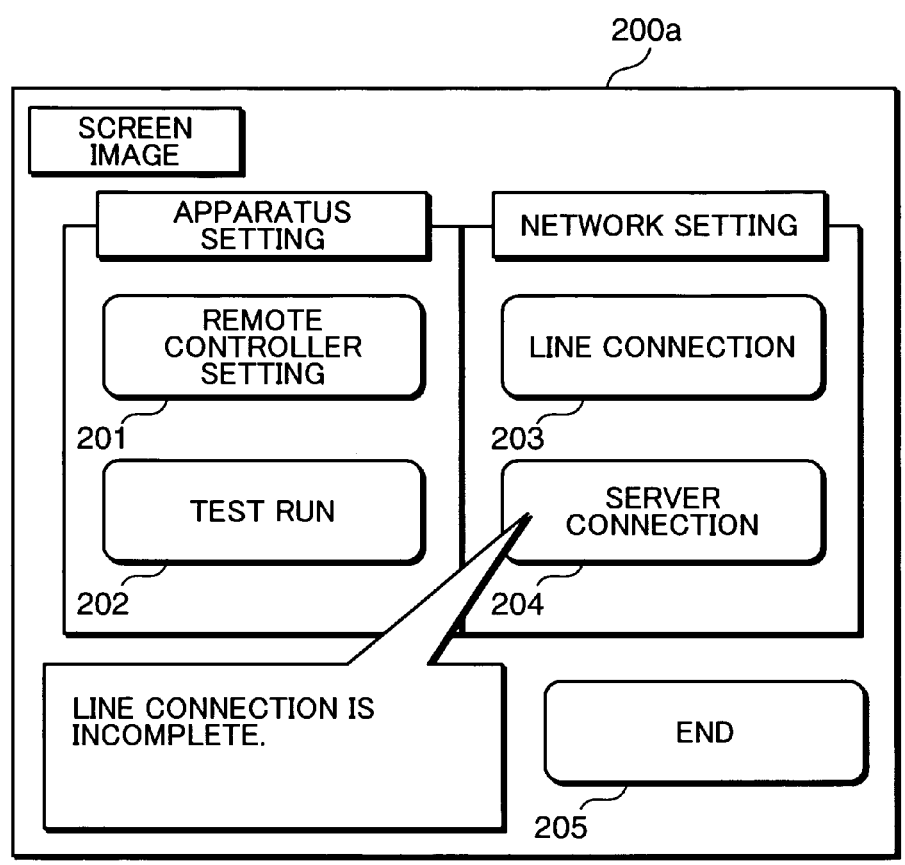
FIG. 4 is a diagram showing an example of a line connection incompleteness screen image to be displayed on a display section of the remote control system in the first embodiment of the invention.

If the server connection button 204 is depressed in Step S17, the remote controller controlling section 113 requests the setting status monitoring section 115 for a setting status to judge whether a line connection process has been completed (Step S18). If the remote controller controlling section 113 judges that the line connection process has not been completed, in other words, there is an unset item which is settable by the network connection setting operator (NO in Step S18), the setting status display controlling section 116 causes the display section 114 to display a line connection incompleteness screen image to notify the operator of the line connection incompleteness to prompt the operator for the setting operation (Step S19). FIG. 4 is a diagram showing an example of the line connection incompleteness screen image to be displayed on the display section. The line connection incompleteness screen image 200a shown in FIG. 4 displays a message "LINE CONNECTION IS INCOMPLETE".

If the remote controller controlling section 113 judges that the line connection process has been completed (YES in Step S18), in Step S19, the remote controller controlling section 113 requests the setting status monitoring section 115 for a setting status to judge whether the apparatus setting process has been completed (Step S20). In this case, if the remote controller controlling section 113 judges that the apparatus connection process has been completed (YES in Step S20), the routine proceeds to a server connection process in Step S21. At this stage, since the network setting and the apparatus setting have been completed, the setting status monitoring section 115 sends information relating to the setting status that all the setting operations have been completed to the setting status information transmitter 112, which, in turn sends the setting status information to the server 104 (Step S21).

Figure 5:
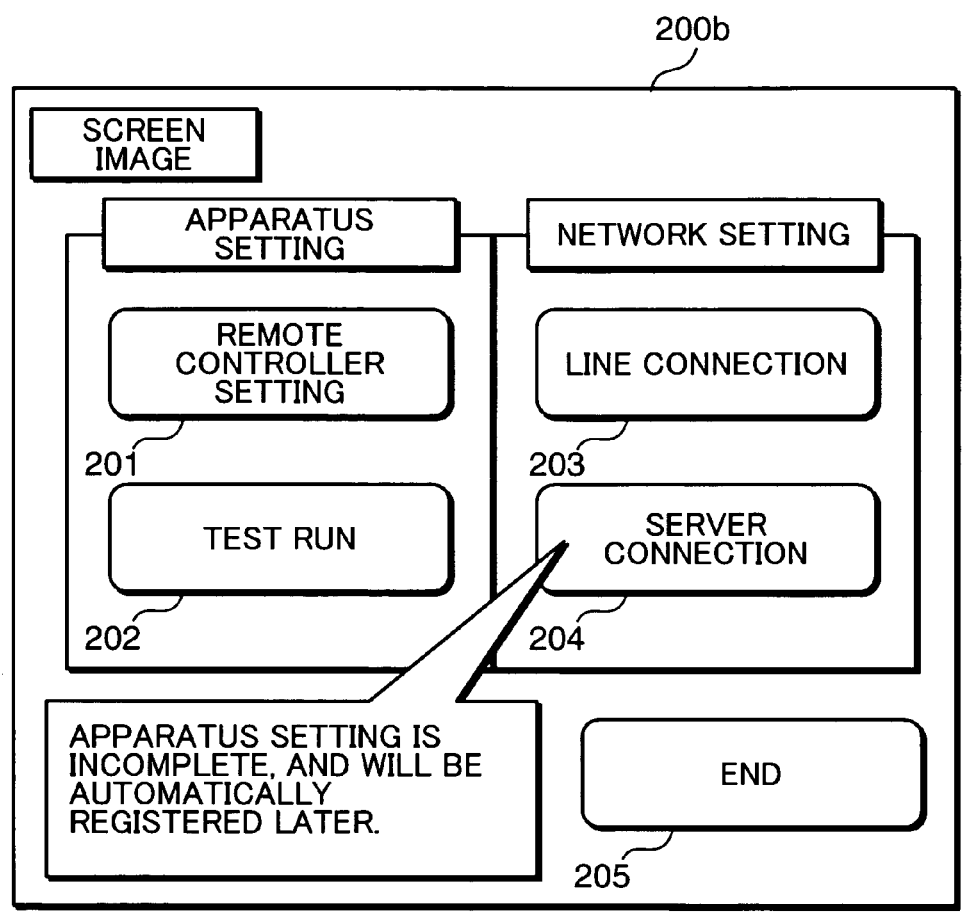
FIG. 5 is a diagram showing an example of an apparatus setting incompleteness screen image to be displayed on the display section of the remote control system in the first embodiment of the invention.

If, on the other hand, the remote controller controlling section 113 judges that the apparatus connection process has not been completed (NO in Step S20), in other words, the unset item is an item relating to the apparatus setting, the setting status display controlling section 116 causes the display section 114 to display an apparatus setting incompleteness screen image to notify the operator of the apparatus setting incompleteness (Step S22). FIG. 5 is a diagram showing an example of the apparatus setting incompleteness screen image to be displayed on the display section. The apparatus setting incompleteness screen image 200b in FIG. 5 displays a message "APPARATUS SETTING IS INCOMPLETE, AND WILL BE AUTOMATICALLY REGISTERED LATER". The network setting operator is informed of completion of the network setting through the message "WILL BE AUTOMATICALLY REGISTERED LATER".

At this stage, the setting status monitoring section 115 stores information representing that the network setting has been completed. When the apparatus setting operator completes all the apparatus settings, which are performed after the network setting, the setting status monitoring section 115 outputs information representing that all the apparatus settings have been completed to the setting status information transmitter 112, which, in turn, automatically executes a server connection process, and sends setting status information representing that the server connection has been completed to the server 104 (Step S6).

In the case (2) that the apparatus setting operator performs the apparatus setting prior to completion of the network setting by the network connection setting operator, works of connecting the bath 101 and the water heater 102, and connecting the water heater 102 and the remote controller 103 are executed. In this case, the remote controller controlling section 113 accepts depressing of the remote controller setting button 201 (Step S1) and depressing of the test run button 202 (Step S8) by the apparatus setting operator. Thereby, the apparatus setting operator is allowed to perform the apparatus setting prior to the network setting.

Figure 6:
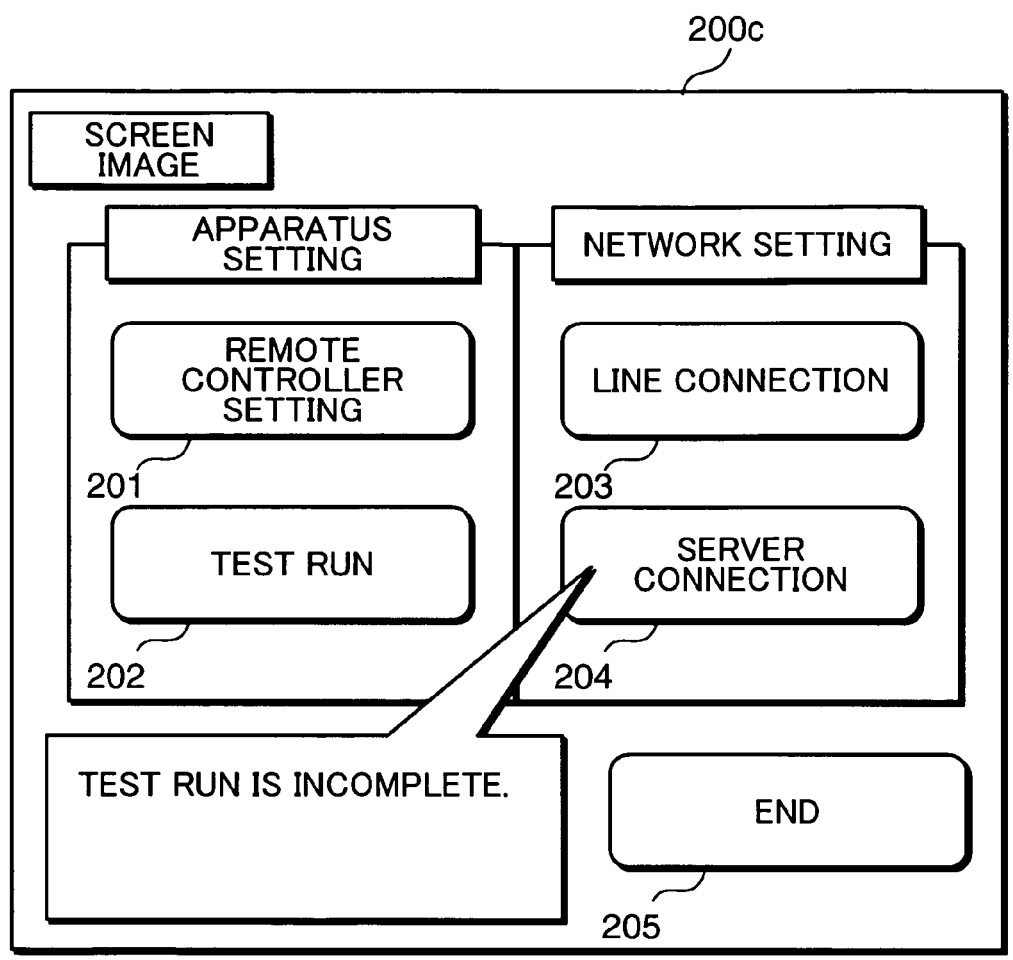
FIG. 6 is a diagram showing an example of a test run incompleteness screen image to be displayed on the display section of the remote control system in the first embodiment of the invention.

If the remote controller controlling section 113 judges that the remote controller setting button 201 has been depressed in Step S1, the routine proceeds to the remote controller setting process in Step S2. After the remote controller setting process is performed in Step S2, the remote controller controlling section 113 requests the setting status monitoring section 115 for a setting status to judge whether a test run process has been completed (Step S3). If the remote controller controlling section 113 judges that the test run process has not been completed, in other words, there is an unset item which is settable by the apparatus setting operator (NO in Step S3), the setting status display controlling section 116 causes the display section 114 to display a test run incompleteness screen image to notify the operator of the test run incompleteness to prompt the operator for the setting operation (Step S4). FIG. 6 is a diagram showing an example of the test run incompleteness screen image to be displayed on the display section. The test run incompleteness screen image 200c shown in FIG. 6 displays a message "TEST RUN IS INCOMPLETE".

If, on the other hand, the remote controller controlling section 113 judges that the test run has been completed (YES in Step S3), the remote controller controlling section 113 requests the setting status monitoring section 115 for a setting status to judge whether the network setting process has been completed (Step S5). If the remote controller controlling section 113 judges that the network connection process has been completed (YES in Step S5), the routine proceeds to a server connection process in Step S6. At this stage, since the network setting and the apparatus setting have been completed, the setting status monitoring section 115 sends information relating to the setting statuses that that all the setting operations have been completed to the setting status information transmitter 112, which, in turn sends the setting status information to the server 104 (Step S6).

Figure 7:
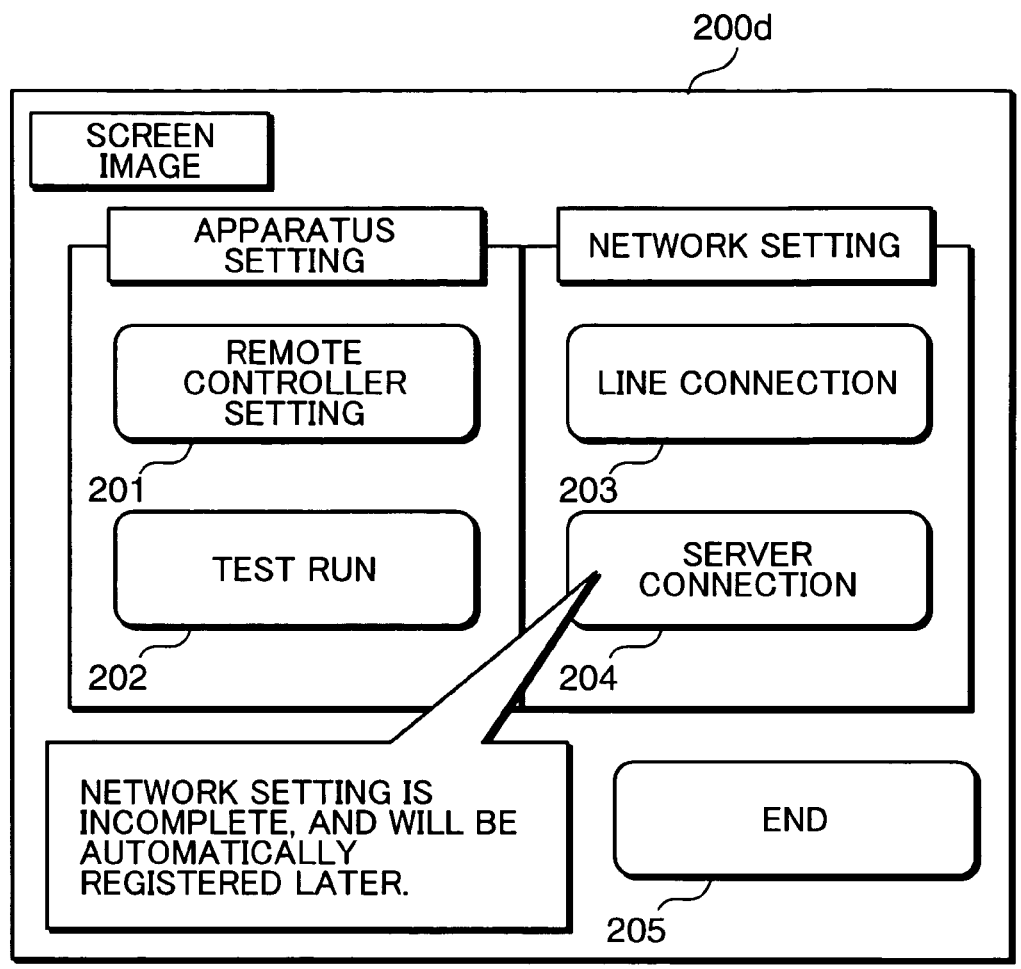
FIG. 7 is diagram showing an example of a network setting incompleteness screen image to be displayed on the display section of the remote control system in the first embodiment of the invention.

If, on the other hand, the remote controller controlling section 113 judges that the network setting process has not been completed, in other words, the unset item is an item relating to the network setting (NO in Step S5), the setting status display controlling section 116 causes the display section 114 to display a network setting incompleteness screen image to notify the operator of the network setting incompleteness (Step S7). FIG. 7 is a diagram showing an example of the network setting incompleteness screen image to be displayed on the display section. The network setting incompleteness screen image 200d in FIG. 7 displays a message "NETWORK SETTING IS INCOMPLETE, AND WILL BE AUTOMATICALLY REGISTERED LATER". The apparatus setting operator is informed of completion of the apparatus setting through the message "WILL BE AUTOMATICALLY REGISTERED LATER".

At this stage, the setting status monitoring section 115 stores information representing that the apparatus setting has been completed. When the network setting operator completes all the network settings, which are performed after the apparatus setting, the setting status monitoring section 115 outputs information representing that all the network settings have been completed, to the setting status information transmitter 112, which in turn, automatically executes a server connection process, and sends setting status information representing that the server connection has been completed to the server 104 (Step S21).

Figure 8:
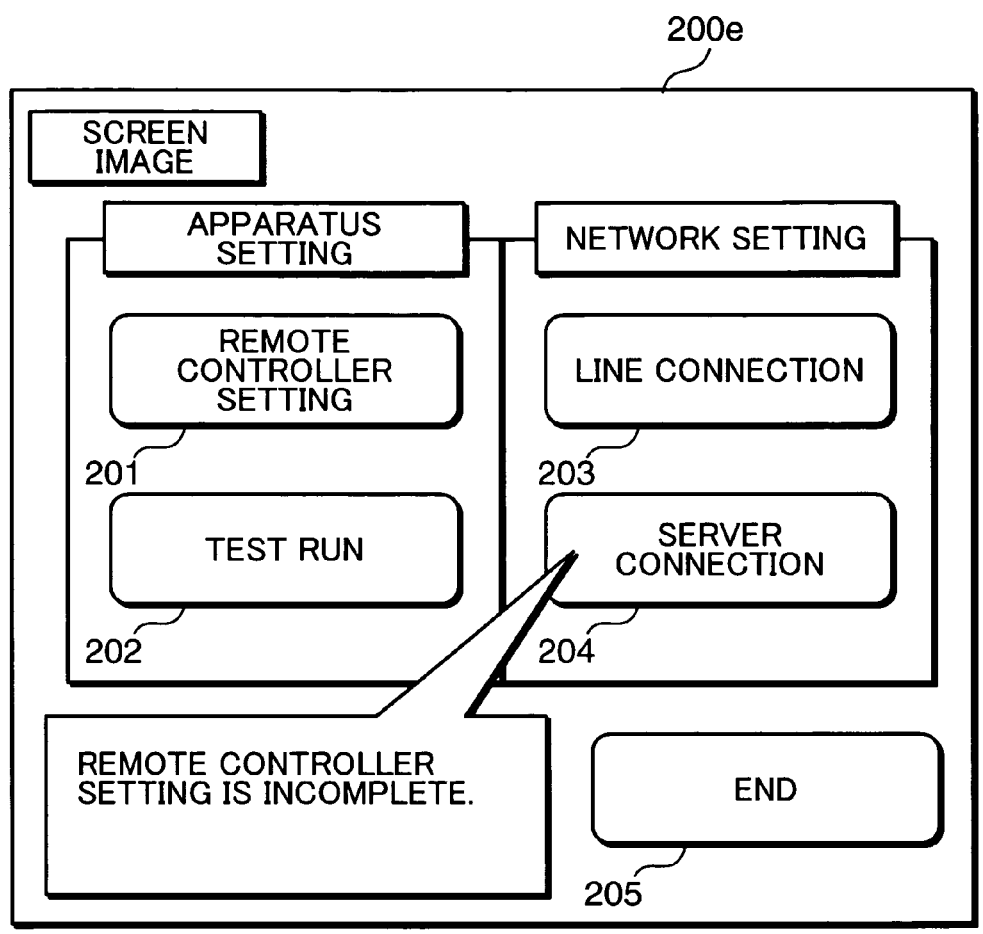
FIG. 8 is a diagram showing an example of a remote controller setting incompleteness screen image to be displayed on the display section of the remote control system in the first embodiment of the invention.

If the remote controller controlling section 113 judges that the test run button 202 has been depressed in Step S8, the routine proceeds to the test run process in Step S9. After the test run process is performed in Step S9, the remote controller controlling section 113 requests the setting status monitoring section 115 for a setting status to judge whether the remote controlling process has been completed (Step S10). If the remote controller controlling section 113 judges that the remote controlling process has not been completed, in other words, there is an unset item which is settable by the apparatus setting operator (NO in Step S10), the setting status display controlling section 116 causes the display section 114 to display a remote controller setting incompleteness screen image to notify the operator of the remote controller setting incompleteness to prompt the operator for the setting operation (Step S11). FIG. 8 is a diagram showing an example of the remote controller setting incompleteness screen image to be displayed on the display section. The remote controller setting incompleteness screen image 200e shown in FIG. 8 displays a message "REMOTE CONTROLLER SETTING IS INCOMPLETE".

If, on the other hand, the remote controller controlling section 113 judges that the remote controller setting has been completed (YES in Step S10), the remote controller controlling section 113 requests the setting status monitoring section 115 for a setting status to judge whether the network setting process has been completed (Step S12). If the remote controller controlling section 113 judges that the network connection process has been completed (YES in Step S12), the routine proceeds to a server connection process in Step S13. At this stage, since the network setting and the apparatus setting have been completed, the setting status monitoring section 115 sends information relating to the setting statuses that all the setting operations have been completed to the setting status information transmitter 112, which, in turn sends the setting status information to the server 104 (Step S13).

If, on the other hand, the remote controller controlling section 113 judges that the network setting process has not been completed, in other words, the unset item is an item relating to the network setting (NO in Step S12), the setting status display controlling section 116 causes the display section 114 to display a message "NETWORK SETTING IS INCOMPLETE, AND WILL BE AUTOMATICALLY REGISTERED LATER" (Step S14). The apparatus setting operator is informed of completion of the apparatus setting by the message "WILL BE AUTOMATICALLY REGISTERED LATER".

At this stage, the setting status monitoring section 115 stores information representing that the apparatus setting has been completed. When the network setting operator completes all the network settings, which are performed after the apparatus setting, the setting status monitoring section 115 outputs information representing that all the network settings have been completed, to the setting status information transmitter 112, which, in turn, automatically executes a server connection process, and sends setting status information relating to the setting statuses representing that the server connection has been completed to the server 104 (Step S21).

It should be noted that the remote controller 103 is disconnected from the server 104 if connection between the remote controller communicator 105 and the server communicator 106 is not established, even if the line connection button 203 has been depressed and the network setting by the network setter 111 has been completed. Accordingly, upon receiving the setting status information representing that all the setting operations have been completed from the setting status monitoring section 115, the setting status information transmitter 112 periodically repeats the connection between the server 104 and the remote controller 103 e.g. every 30 minutes until the connection between the server 104 and the remote controller 103 is completed, whereby communication between the remote controller 103 and the server 104 is established.

Also, the remote controller controlling section 113 has a function of permitting, via the display section 114, a user to operate the bath 101 or the water heater 102 upon completion of the apparatus setting by the apparatus setter 110 even if the network setting by the network setter 111 has not been completed. With use of this function, the user is allowed to utilize the functions of the bath 101 and the water heater 102 even if the remote controller 103 is disconnected from the network due to some reason, and the network-related function of the remote control system is made unusable.

As mentioned above, the setting statuses of the apparatus setter 110 and the network setter 111 are monitored, and the setting status information transmitter 112 transmits the information that the setting operations by the apparatus setter 110 and the network setter 111 have been completed to the server 104 upon completion of the setting operations by the apparatus setter 110 and the network setter 111. Also, the setting status display controlling section 116 displays respective current setting statuses based on the information acquired by the setting status monitoring section 115, and displays information as to whether the respective setting operations to be executed by the apparatus setting operator and the network setting operator have been completed. These arrangements enable to provide a remote control system that allows the respective setting operators to perform their setting operations independently and efficiently.

The display section 114 of the remote controller 103 may display that the setting status information has been sent to the server 104 upon completion of the respective setting operations. Also, the server 104 may request the remote controller 103 for a setting status if the server 104 fails to receive a signal indicating a setting status within a predetermined duration. Particularly, if the server 104 is connected to a number of remote controllers 103, and fails to receive a signal indicating a setting status from some of the remote controllers 103 while succeeded in receiving a setting status signal from most of the remote controllers 103, the server 104 may send an alert signal to the some of the remote controllers 103, or control a display device other than the display sections of the some of the remote controllers 103 to prompt the user, the apparatus/network setting operator, or a related staff for confirmation. For instance, in the case where setting incompleteness has been found in one of the houses in a housing complex or an apartment building, it is highly likely that the setting operation has been left undone or incomplete. In such a case, the user, the apparatus/network setting operator, or the related staff is prompted for confirmation. Alternatively, the current setting status may be sent to the server 104 at the time when the remote controller 103 is communicatively connected to the server 104, in addition to transmission of the information that both the apparatus setting and the network setting have been completed to the server 104 at the time when the apparatus setting and the network setting have been completed. Further alternatively, the current setting statuses may be sent to the server 104 at the time when one of the apparatus setting and the network setting has been completed.

This embodiment describes the case that the display section 114 is the touch panel where information is displayed, and user's operation designation is accepted. Alternatively, user's operation designation may be performed by other means.

The various means described in the embodiment may be implemented in the form of a program that causes various hard resources to cooperate with each other such as an electric/information apparatus, a computer, and server equipped with a CPU (or a microcomputer), a RAM, a ROM, a storing/recording device, and an input/output device. Use of the program facilitates distribution/update of the program and an installation operation thereof by recording the program in a recording medium such as a magnetic medium or an optical medium, or by delivering the program using a communications line such as the Internet.

(Second Embodiment)

Figure 9:
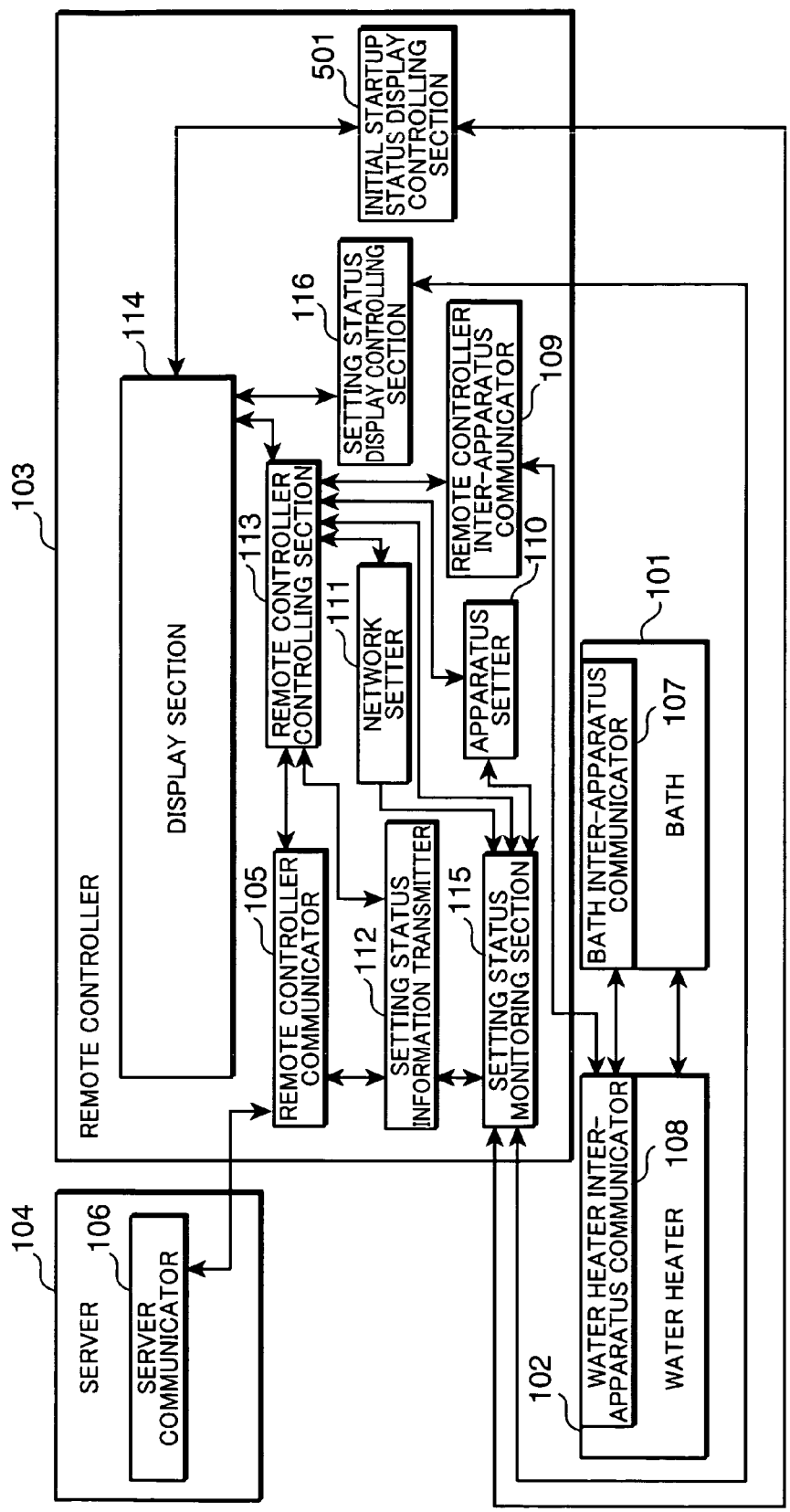
FIG. 9 is a block diagram showing a configuration of a remote control system in a second embodiment of the invention.

A remote control system in a second embodiment of the invention is described in the following. FIG. 9 is a block diagram showing an example of the remote control system in the second embodiment. Referring to FIG. 9, the remote control system includes a bath 101, a water heater 102, a remote controller 103, and a server 104. Description on the same arrangement of the remote control system shown in FIG. 9 as that of the remote control system shown in FIG. 1 will be omitted herein.

The remote controller 103 has an initial startup status display controlling section 501 in addition to constituent elements corresponding to the constituent elements of the first embodiment. The initial startup status display controlling section 501 reads out a setting status of the remote controller 103 at an initial startup time of the remote controller 103 from the setting status monitoring section 115, and displays the readout setting status on the display section 114. The initial startup status display controlling section 501 includes a microcomputer. In the second embodiment, the display section 114 and the initial startup status display controlling section 501 correspond to an example of the setting status display section.

An operation and a process of the remote control system having the above configuration are described in the following.

First, the server 104 is activated to start an operation of the remote control system. After the remote controller 103 is installed, and an operation of the remote controller 103 is started, the remote controller controlling section 113 controls the display section 114 to display an operation panel of the bath 101, and interface buttons for allowing apparatus connection and network setting based on a program stored in the remote controller controlling section 113. When the user depresses an intended button displayed on the display section 114, the remote controller controlling section 113 starts controlling a relevant section in association with the depressed button to perform an operation assigned to the relevant section.

Immediately after a power is supplied to the remote controller 103 to start the operation of the remote controller 103, the remote controller controlling section 113 issues a command to the setting status monitoring section 115 so as to control the initial startup status display controlling section 501 to output a setting status of the remote controller 103 at an initial startup time of the remote controller 103, which is changed from a power-off state to a power-on state.

Figure 10:
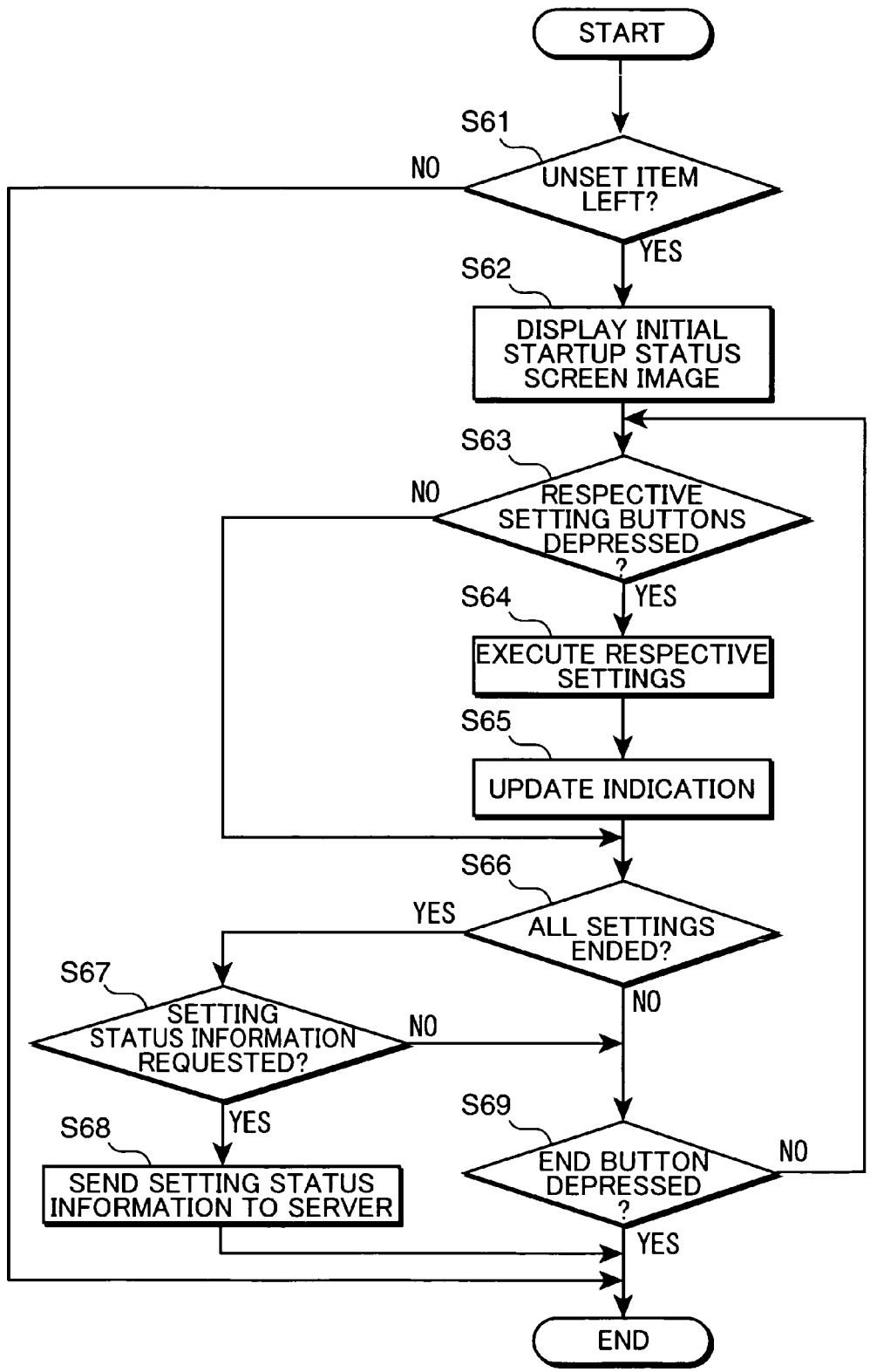
FIG. 10 is a flowchart showing an example of a setting operation to be executed by the remote control system in the second embodiment of the invention at an initial startup time of the remote control system.

FIG. 10 is a flowchart showing an example of a setting operation at the initial startup time. An operation of the initial startup status display controlling section 501 is described referring to FIG. 10. At the initial startup time, the initial startup status display controlling section 501 judges whether there is an unset item based on the information stored in the setting status monitoring section 115 (Step S61). If the initial startup status display controlling section 501 judges that there is an unset item (YES in Step S61), the initial startup status display controlling section 501 causes the display section 114 to display an initial startup status screen image as shown in (a) of FIG. 11.

Figure 11:
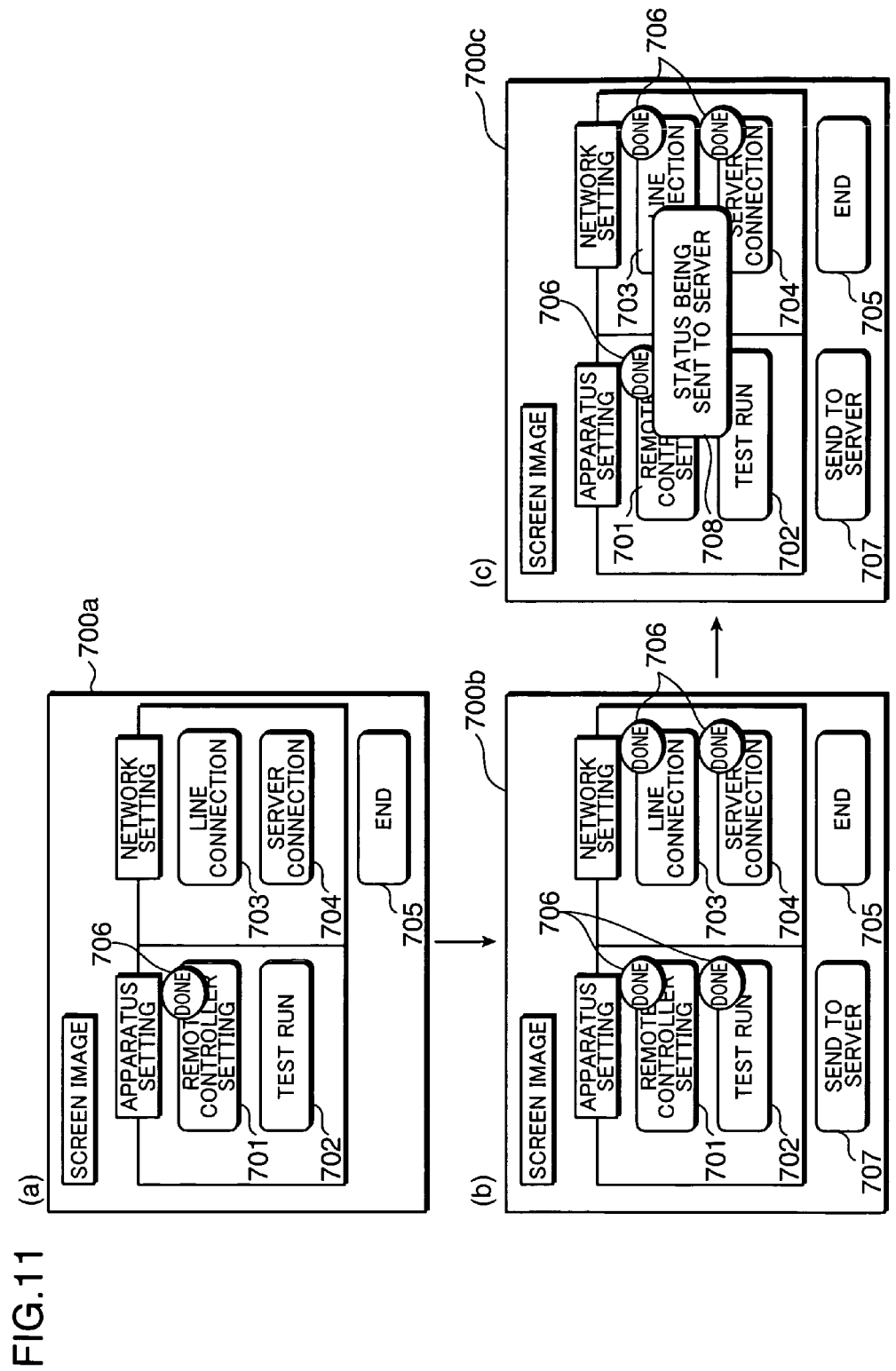
FIG. 11 is a diagram showing an example of a screen image to be displayed on a display section of the remote control system in the second embodiment of the invention at the initial startup time of the remote control system.

FIG. 11 is a diagram showing an example of the initial startup status screen image to be displayed on the display section. In the figure, (a) shows an example of the initial startup status screen image when a remote controller setting process has been completed; (b) shows an example of the initial startup status screen image when all the setting operations have been completed; (c) shows an example of the initial startup status screen image when information relating to a setting status is being sent. As shown in (a) through (c) of FIG. 11, the initial startup status screen image 700a includes a remote controller setting button 701 and a test run button 702, which are used for apparatus setting; a line connection button 703 and a server connection button 704, which are used for network setting; and an end button 705. Since the functions of the buttons 701 through 705 are substantially the same as those of the corresponding buttons on the screen image shown in FIG. 2, description thereof will be omitted herein.

If the remote controller setting process has been completed, for instance, the initial startup status display controlling section 501 causes the display section to display a setting completion mark 706. The initial startup status display controlling section 501 may cause the display section to display an image indicating that depressing of the remote control setting button is disabled. This arrangement allows a setting operator to easily recognize which setting has been completed. In Step S65, the indication of the setting completion mark is updated each time the relevant setting button is depressed (Step S63), and the relevant setting is executed (Step S64). The operations from Steps S63 through S66 are cyclically executed until the initial startup status display controlling section 501 judges that the end button 705 has been depressed.

In the case where the initial startup status screen image is updated in Step S65, or the initial startup status display controlling section 501 judges that none of the relevant setting buttons has been depressed in Step S63 (NO in Step S63), the initial startup status display controlling section 501 judges whether all the setting operations have been completed (Step S66). The judgment as to whether all the setting operations have been completed may be made based on a judgment as to whether all the setting statuses represent completion, referring to the setting status information stored in the setting status monitoring section 115. Alternatively, the judgment as to whether all the setting operations have been completed may be made based on a judgment as to whether the setting completion mark 706 has been displayed on all the setting buttons 701 through 704.

If the initial startup status display controlling section 501 judges that all the setting operations have been completed (YES in Step S66), the initial startup status display controlling section 501 judges whether information relating to the setting statuses is to be sent to the server 104 (Step S67). As shown in (b) of FIG. 11, if all the setting operations have been completed, and if the setting completion mark 706 has been displayed on all the setting buttons 701 through 704, the initial startup status display controlling section 501 causes the display section to display a server request button 707 to prompt the user e.g. the setting operator for a conformation as to whether the setting status information is to be sent to the server 104. If the setting operator depresses the server request button 707, and if the initial startup status display controlling section 501 judges that transmission of the setting status information to the server 104 has been requested (YES in Step S67), the remote controller controlling section 113 reads out the setting status information stored in the setting status monitoring section 115, and outputs the readout setting status information to the remote controller communicator 105, which, in turn, sends, to the server 104, the setting status information outputted by the remote controller 113 (Step S68). During the transmission of the setting status information to the server 104, as shown in (c) of FIG. 11, the initial startup status display controlling section 501 causes the display section to display a message 708 "SETTING STATUS BEING SENT TO SERVER" in the middle of the initial startup status screen image 700c.

If, on the other hand, the initial startup status display controlling section 501 judges that all the setting operations have not been completed (NO in Step S66), or judges that the server request button 707 has not been depressed by the operator, and accordingly, the setting status information is not to be sent to the server 104 (NO in Step S67), the remote controller controlling section 113 judges whether the end button 705 has been depressed by the operator (Step S69). If the remote controller controlling section 113 judges that the end button 705 has not been depressed (NO in Step S69), the routine returns to the process in Step S63 to judge whether the respective setting buttons 701 through 704 have been depressed.

If the end button 705 is judged to have been depressed in Step S69 (YES in Step S69), or after the setting status information has been sent to the server 104 in Step S68, or if it is judged that there is no unset item in Step S61 (NO in Step S61), the routine is ended.

If the power is turned on again to execute an initial startup operation in a state that all the setting operations have been completed, the initial startup status screen image (see FIG. 11) is not displayed since there is no unset item (NO in Step S61). This arrangement enables the setting operator to judge that all the setting operations have been completed merely by turning on the power again.

As mentioned above, controlling the initial startup status display controlling section 501 to cause the display section to display setting status information indicating that a certain setting operation has been incomplete in response to the power supply provides a remote control system that enables the setting operator to easily perform the setting operations and easily confirm the setting statuses.

Alternatively, setting status information indicating that a certain setting operation is incomplete may be displayed when the display section 114 is turned on at a time other than the time when the power is supplied to the remote controller 103, or may be displayed every predetermined time interval e.g. at 5 minutes interval. Further alternatively, the setting status information indicating that a certain setting operation is incomplete may be sent to the server 104 in response to turning on of the display section 114, or at the aforementioned time interval. Specifically, unlike the embodiment in which the server request button 707 is displayed after all the setting operations have been completed, the server request button 707 may be constantly displayed on the initial startup status screen image, and information relating to the current setting statuses may be sent to the server 104 in response to depressing of the server request button 707.

This embodiment describes the case that the apparatus is the water heater. Alternatively, the apparatus equipped with the remote controller may be a remote control system connectable to the server, such as facility equipment, or household electric appliances other than the water heater.

The various means described in the embodiment may be implemented in the form of a program that causes various hard resources to cooperate with each other such as an electric/information apparatus, a computer, and a server equipped with a CPU (or a microcomputer), a RAM, a ROM, a storing/recording device, and an input/output device. Use of the program facilitates distribution/update of the program and an installation operation thereof by recording the program in a recording medium such as a magnetic medium or an optical medium, or by delivering the program using a communications line such as the Internet.

The diagrams concerning the screen images described in the embodiment are merely examples of the screen image, and not limited thereto.

(Third Embodiment)

A water heater control system in a third embodiment of the invention is described in the following. Whereas the remote control system in the foregoing respective embodiments includes the bath 101, the water heater 102, the remote controller 103, and the server 104, the third embodiment of the invention may be directed to a water heater control system equipped with a bath 101, a water heater 102, and a server 104 by providing a function of a remote controller 103 in the water heater 102.

Figure 12:
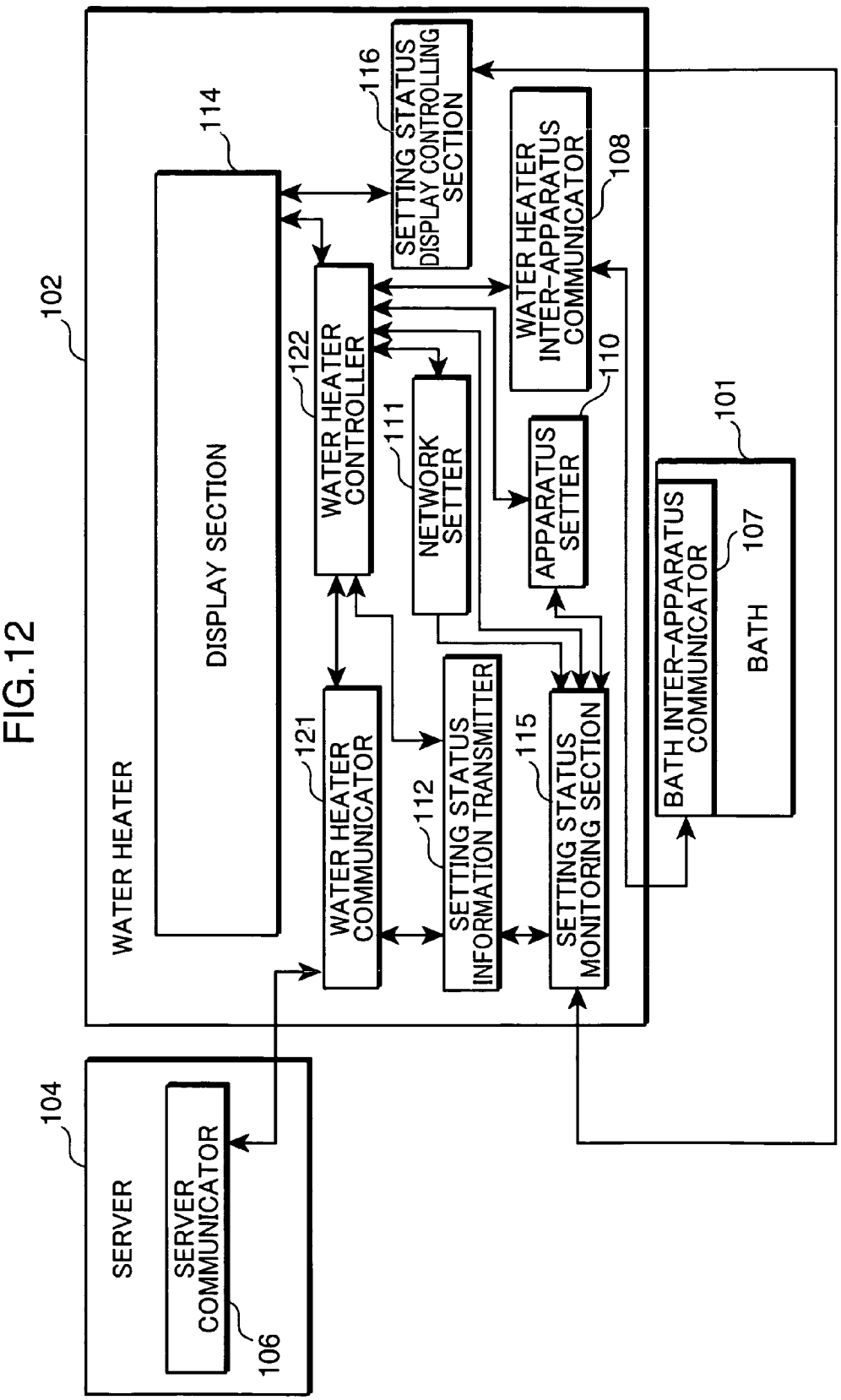
FIG. 12 is a block diagram showing an example of a remote control system in a third embodiment of the invention.

FIG. 12 is a block diagram showing an example of the water heater control system in the third embodiment. Referring to FIG. 12, the water heater control system includes the bath 101, the water heater 102, and the server 104. The water heater 102 includes a water heater inter-apparatus communicator 108, an apparatus setter 110, a network setter 111, a setting status information transmitter 112, a display section 114, a setting status monitoring section 115, a setting status display controlling section 116, a water heater communicator 121, and a water heater controller 122. Description on the arrangement of the water heater control system shown in FIG. 12 which are identical or equivalent to the arrangement of the remote control system shown in FIG. 1 will be omitted herein, and only the arrangement in the third embodiment which is different from the arrangements in the first and second embodiments will be described.

The water heater communicator 121 is connected, via a network, to a server communicator 106 of the server 104, and has the same function as the function of the remote controller communicator 105 shown in FIG. 1. The water heater controller 122 controls the respective blocks constituting the water heater 102, and has the same function as the function of the remote controller controlling section 113 shown in FIG. 1.

The apparatus setter 110 performs at least one of a setting regarding an operation of the water heater 102, and a test run of the water heater 102. The operation setting is a setting of determining an operation of an apparatus body, and includes setting the kind of a gas to be used in the water heater 102 e.g. city gas or propane gas; setting an operating frequency for the power source of the water heater e.g. 50 Hz or 60 Hz; and setting a water level controlling method in supplying heated water into the bath e.g. setting regarding a water level control by a water level sensor or setting regarding a water supply volume by a flow sensor. The test run in the third embodiment is merely an example of confirming an operation of the water heater 102, and the confirmation operation of the water heater 102 may be performed by other means.

In this embodiment, the water heater 102 corresponds to an example of the apparatus, the apparatus setter 110 corresponds to an example of the apparatus setting section, the network setter 111 corresponds to an example of the network setting section, the setting status monitoring section 115 corresponds to an example of the setting status section, the display section 114 and the setting status display controlling section 116 correspond to an example of the setting status display section, and the water heater communicator 121 and the setting status information transmitter 112 correspond to an example of the setting status information transmitting section.

An operation and a process of the water heater control system having the above configuration are described in the following.

First, the server 104 is activated to start an operation of the water heater control system. After the water heater 102 is installed, and an operation of the water heater 102 is started, the water heater controller 122 controls the display section 114 to display an operation panel of the bath 101, and interface buttons for allowing apparatus connection and network setting based on a program stored in the water heater controller 122. When the user depresses an intended button displayed on the display section 114, the water heater controller 122 starts controlling a relevant section in association with the depressed button to perform an operation assigned to the relevant section.

Figure 13:
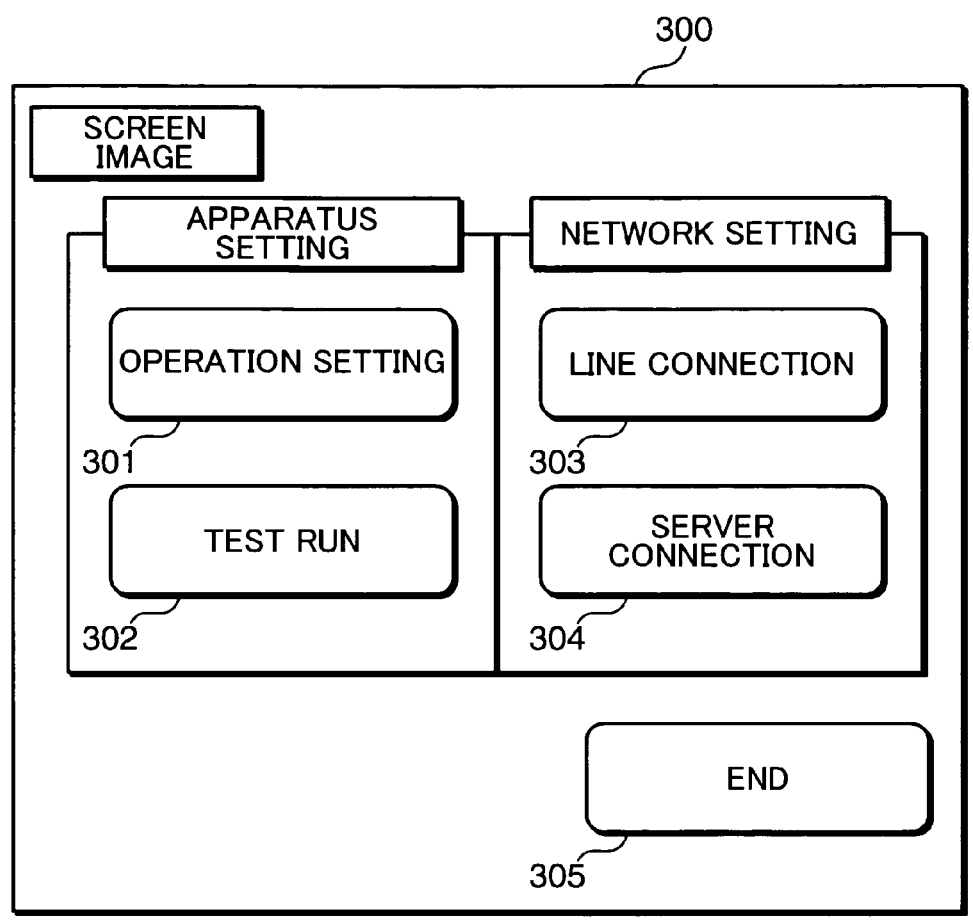
FIG. 13 is a diagram showing an example of a screen image in the third embodiment of the invention.

FIG. 13 is a diagram showing an example of a screen image to be displayed on the display section 114 in the third embodiment. Referring to FIG. 13, the screen image 300 includes an operation setting button 301, a test run button 302, a line connection button 303, a server connection button 304, and an end button 305.

The operation setting button 301 and the test run button 302 are buttons relating to the apparatus setting. The line connection button 303 and the server connection button 304 are buttons relating to the network setting. Upon completion of the operations designated by the respective setting buttons, information relating to the setting statuses on the apparatus setting and the network setting is stored in the setting status monitoring section 115.

When the user depresses the operation setting button 301, the water heater controller 122 performs an operation setting of the water heater 102, using the apparatus setter 110 (operation setting process). Since the functions of the buttons 302 through 305 are substantially the same as those of the buttons 202 through 205 shown in FIG. 2, description thereof will be omitted herein.

Figure 14A:
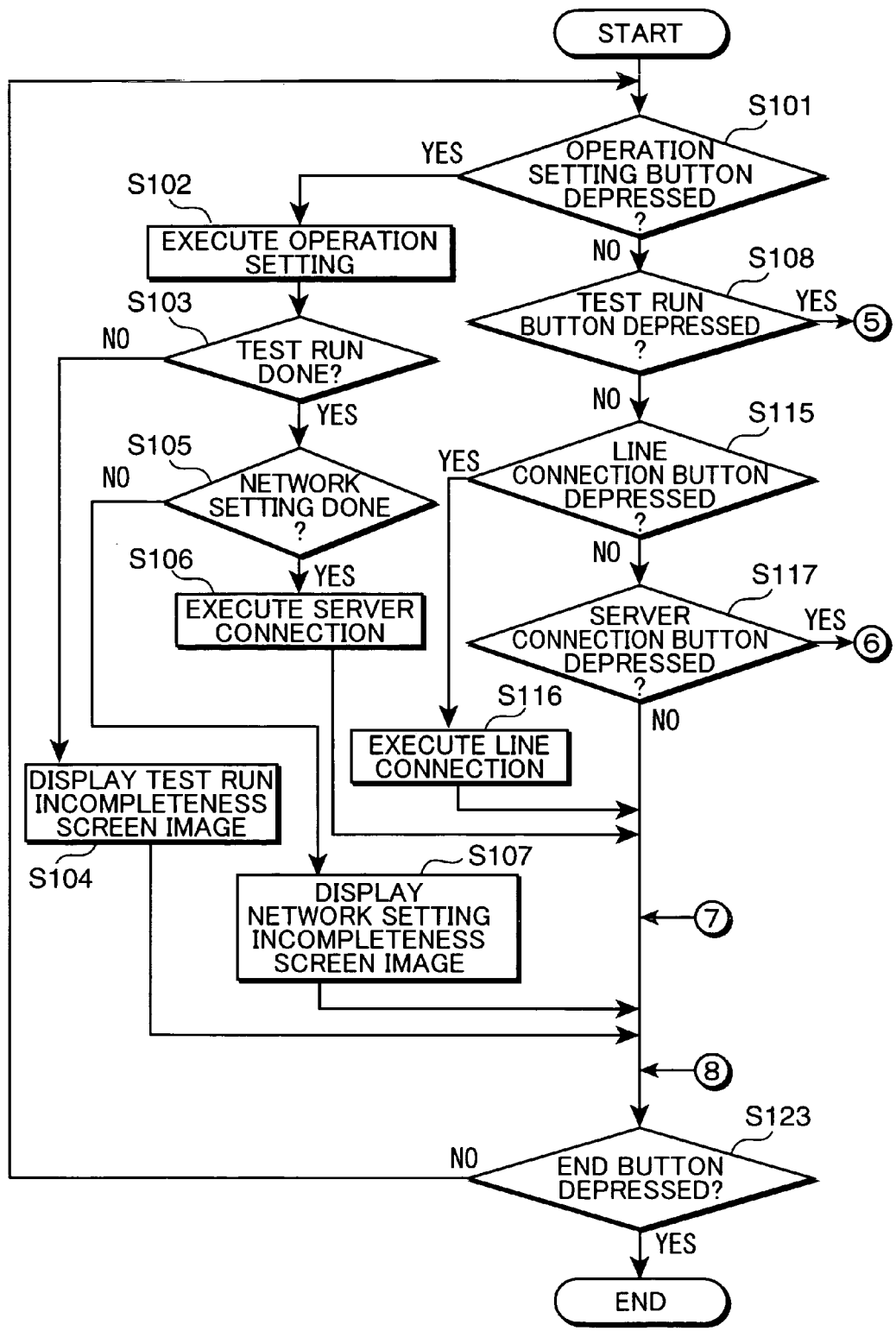
FIGS. 14A and 14B are flowcharts showing an example of a setting operation in the third embodiment of the invention.
Figure 14B:
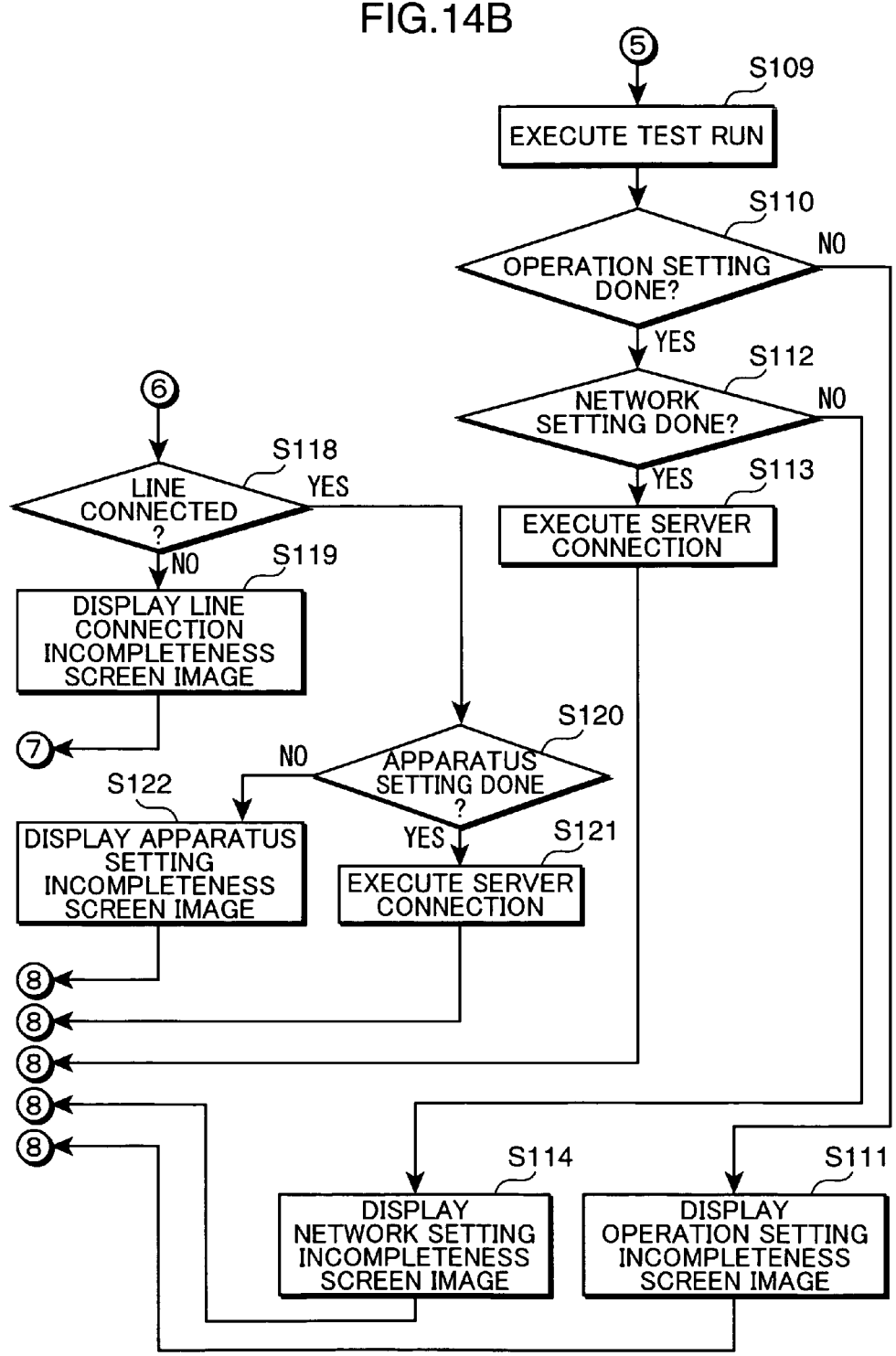
Figure 15:
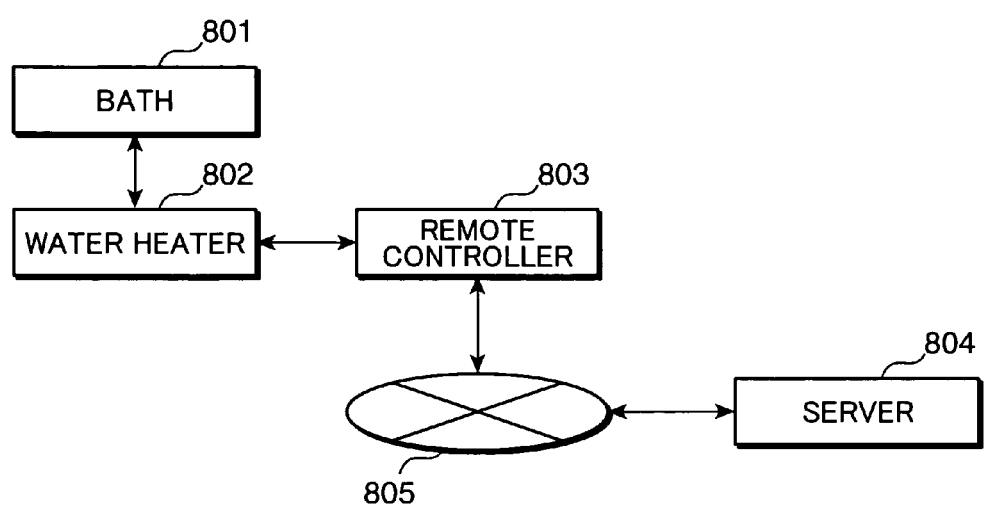
FIG. 15 is a block diagram showing a configuration of a conventional remote control system.

FIG. 14 is a flowchart showing an example of the setting operation in the third embodiment of the invention. FIG. 14 shows an example of the screen image 300 to be displayed on the display section 114 in response to a command issued from the water heater controller 122. The process shown in FIG. 14 is substantially the same as the process shown in FIG. 3. In other words, in FIG. 14, the process to be executed by the remote controller controlling section 113 in FIG. 3 is executed by the water heater controller 122. Therefore, merely the process of the third embodiment which is different from the process in FIG. 3 is described in the following.

First, the water heater controller 122 judges whether the operation setting button 301 of the screen image 300 displayed on the display section 114 has been depressed (Step S101). If the water heater controller 122 judges that the operation setting button 301 has been depressed (YES in Step S101), the routine proceeds to the operation setting process in Step S102.

If, on the other hand, the water heater controller 122 judges that the operation setting button 301 has not been depressed (NO in Step S101), the water heater controller 122 judges whether the test run button 302 of the screen image 300 displayed on the display section 114 has been depressed (Step S108).

After the test run process is completed in Step S109, the water heater controller 122 requests the setting status monitoring section 115 for a setting status to judge whether the operation setting process has been completed (Step S110). At this stage, if the water heater controller 122 judges that the operation setting process has not been completed, in other words, there is an unset item that is settable by the apparatus setting operator (NO in Step S110), the setting status display controlling section 116 causes the display section 114 to display an operation setting incompleteness screen image to notify the operator of the operation setting incompleteness to prompt the operator for the setting operation (Step S111).

If, on the other hand, the water heater controller 122 judges that the operation setting process has been completed (YES in Step S110), the water heater controller 122 requests the setting status monitoring section 115 for a setting status to judge whether the network setting has been completed (Step S112).

The third embodiment describes the case that the water heater 102 has the function substantially equivalent to the function of the remote controller 103 in the first embodiment. Alternatively, the water heater 102 may have a function substantially equivalent to the function of the remote controller 103 in the second embodiment.

The aforementioned embodiments essentially includes the invention having the following arrangements.

An apparatus control system according to an aspect of the invention is provided with an apparatus which requires a plurality of different settings, an apparatus controlling device for controlling the apparatus, and a server which is communicatively connected to the apparatus controlling device via a network. The apparatus controlling device includes: an apparatus setting section for accepting an input by a first operator, and performing a setting, the setting being at least one of a setting on a connection between the apparatus and the apparatus controlling device, and a confirmation on an operation of the apparatus including a test run of the apparatus using the apparatus controlling device; a network setting section for accepting an input by a second operator different from the first operator, and performing a setting on a connection between the apparatus controlling device and the server; a setting status monitoring section for monitoring an apparatus setting status representing whether the setting by the apparatus setting section has been completed, and a network setting status representing whether the setting by the network setting section has been completed; and a setting status display section for displaying the apparatus setting status and the network setting status detected by the setting status monitoring means.

In the above arrangement, the apparatus setting section accepts an input by a first operator, and performs the at least one of the connection setting between the apparatus and the apparatus controlling device, and the operation confirmation including the test run of the apparatus using the apparatus controlling device. The network setting section accepts an input by a second operator different from the first operator, and performs the connection setting between the apparatus controlling device and the server. The setting status monitoring section monitors the apparatus setting status representing whether the setting by the apparatus setting section has been completed, and the network setting status representing whether the setting by the network setting section has been completed. The setting status display section displays the apparatus setting status and the network setting status detected by the setting status monitoring section.

The above arrangement allows displaying the setting statuses as to whether the settings to be executed by the respective operators have been completed, thereby enabling the respective operators to perform the setting operations independently and efficiently.

In the above apparatus control system, the apparatus controlling device preferably may further include a setting status information transmitting section for transmitting, to the server, information relating to the apparatus setting status and the network setting status monitored by the setting status monitoring section, and the server may include a setting status information receiving section for receiving the information relating to the apparatus setting status and the network setting status transmitted by the setting status information transmitting section.

In the above arrangement, the setting status information transmitting section of the apparatus controlling device transmits, to the server, the information relating to the apparatus setting status and the network setting status monitored by the setting status monitoring section. The setting status information receiving section of the server receives the information relating to the apparatus setting status and the network setting status transmitted by the setting status information transmitting section. With this arrangement, if the apparatus setting and the network setting are performed by different operators, the setting status information as to whether the settings to be executed by the respective operators have been completed is transmitted to the server. Thus, the server is operative to administer the setting statuses. This enables the operators to administer completion of the setting operations, and prevents an operator's inadvertent operation that setting may be left undone or incomplete.

In the above apparatus control system, preferably, the setting status information transmitting section may transmit, to the server, the information relating to the apparatus setting status and the network setting status monitored by the setting status monitoring section after the setting by the apparatus setting section and the setting by the network setting section have been completed.

In the above arrangement, after the setting by the apparatus setting section and the setting by the network setting section have been completed, the setting status information transmitting section transmits, to the server, the information relating to the apparatus setting status and the network setting status monitored by the setting status monitoring section . This enables to send the information relating to the apparatus setting status and the network setting status to the server upon completion of the apparatus setting and the network setting.

In the above apparatus control system, preferably, the setting status display section may display the apparatus setting status and the network setting status monitored by the setting status monitoring section when a power is supplied to the apparatus controlling device.

In the above arrangement, the setting status display section displays the apparatus setting status and the network setting status monitored by the setting status monitoring section in response to the power supply to the apparatus controlling device. This allows for displaying the apparatus setting status and the network setting status in response to the power supply, thereby enabling the operators to easily confirm the current setting statuses, and easily perform the setting operations.

In the above apparatus control system, preferably, the setting status display section may display the apparatus setting status and the network setting status monitored by the setting status monitoring section after completion of at least one of the setting by the apparatus setting section and the setting by the network setting section.

In the above arrangement, the setting status display section displays the apparatus setting status and the network setting status monitored by the setting status monitoring section upon completion of the at least one of the setting by the apparatus setting section and the setting by the network setting section. This allows for displaying the apparatus setting status and the network setting status after completion of the apparatus setting or completion of the network setting, thereby enabling the operators to easily confirm the current setting statuses and easily perform the setting operations.

In the above apparatus control system, preferably, the setting status display section may display information as to whether the setting by the apparatus setting section and the setting by the network setting section have been completed in a discriminative display format.

In the above arrangement, the setting status display section displays the information as to whether the setting by the apparatus setting section and the setting by the network setting means have been completed in the discriminative display format. This provides the operators with easy confirmation as to whether the apparatus setting and the network setting have been completed.

In the above apparatus control system, the apparatus setting section may preferably perform the connection so that a control signal for controlling the apparatus is transmittable, and a response signal to be sent from the apparatus is receivable, and the network setting section may preferably perform the connection setting so that the server is identified on the network, and the apparatus controlling device is communicatively connected to the server.

In the above arrangement, the apparatus setting section performs the connection setting so that the control signal for controlling the apparatus is transmittable, and the response signal to be sent from the apparatus is receivable, and the network setting section performs the connection setting so that the server is identified on the network, and the apparatus controlling device is communicatively connected to the server.

In the above arrangement, even if the apparatus and the apparatus controlling device are electrically connected, the apparatus controlling device and the server are connected in a software manner, and the respective connection settings are performed by different operators, the respective operators can execute the setting operations independently and efficiently.

An apparatus according to another aspect of the invention is an apparatus which is communicatively connected to a server via a network, and requires a plurality of different settings. The apparatus comprises: an apparatus setting section for accepting an input by a first operator, and performing a setting, the setting being at least one of a setting on an operation of the apparatus, and a confirmation on the operation of the apparatus including a test run of the apparatus; a network setting section for accepting an input by a second operator different from the first operator, and performing a setting on a connection between the apparatus and the server; a setting status monitoring section for monitoring an apparatus setting status representing whether the setting by the apparatus setting section has been completed, and a network setting status representing whether the setting by the network setting section has been completed; and a setting status display section for displaying the apparatus setting status and the network setting status detected by the setting status monitoring section.

In the above arrangement, the apparatus setting section accepts an input by a first operator, and performs the at least one of the operation setting, and the operation confirmation including the test run of the apparatus. The network setting section accepts an input by a second operator different from the first operator, and performs the connection setting between the apparatus and the server. The setting status monitoring section monitors the apparatus setting status representing whether the setting by the apparatus setting section has been completed, and the network setting status representing whether the setting by the network setting section has been completed. The setting status display means section displays the apparatus setting status and the network setting status detected by the setting status monitoring section.

With the above arrangement, if the apparatus setting and the network setting are performed by the different operators, the setting statuses as to whether the settings to be executed by the respective operators have been completed are displayed. This enables the respective operators to perform the setting operations independently and efficiently.

Preferably, the apparatus may further comprise a setting status information transmitting section for transmitting, to the server, information relating to the apparatus setting status and the network setting status detected by the setting status monitoring section.

In the above arrangement, the setting status information transmitting section transmits, to the server, the information relating to the apparatus setting status and the network setting status detected by the setting status monitoring section. With this arrangement, if the apparatus setting and the network setting are performed by different operators, the setting status information as to whether the settings to be executed by the respective operators have been completed is transmitted to the server, which, in turn, administers the setting statuses. This enables the operators to administer completion of the setting operations, and prevents an operator's inadvertent operation that setting may be left undone or incomplete.

In the above apparatus, preferably, the setting status information transmitting section may transmit, to the server, the information relating to the apparatus setting status and the network setting status detected by the setting status monitoring section after the setting by the apparatus setting section and the setting by the network setting section have been completed.

In the above arrangement, after the setting by the apparatus setting section and the setting by the network setting section have been completed, the setting status information transmitting section transmits, to the server, the information relating to the apparatus setting status and the network setting status detected by the setting status monitoring section. This allows for sending the information relating to the apparatus setting status and the network setting status to the server after completion of the apparatus setting and the network setting.

In the above apparatus, preferably, the setting status display section may display the apparatus setting status and the network setting status detected by the setting status monitoring section when a power is supplied to the apparatus.

In the above arrangement, the setting status display section displays the apparatus setting status and the network setting status detected by the setting status monitoring section in response to the power supply to the apparatus. This allows for displaying the apparatus setting status and the network setting status in response to the power supply, thereby allowing the operators to easily confirm the current setting statuses, and easily perform the setting operations.

In the above apparatus, preferably, the setting status display section may display the apparatus setting status and the network setting status detected by the setting status monitoring section after completion of at least one of the setting by the apparatus setting section and the setting by the network setting section.

In the above arrangement, the setting status display section displays the apparatus setting status and the network setting status detected by the setting status monitoring section after completion of the at least one of the setting by the apparatus setting section and the setting by the network setting section. With this arrangement, the apparatus setting status and the network setting status are displayed after completion of the apparatus setting or completion of the network setting. This enables the operators to easily confirm the current setting statuses, and easily perform the setting operations.

In the above apparatus, preferably, the setting status display section may display information as to whether the setting by the apparatus setting section and the setting by the network setting section have been completed in a discriminative display format.

In the above arrangement, the setting status display section displays the information as to whether the setting by the apparatus setting section and the setting by the network setting section have been completed in the discriminative display format. This provides the operators with easy confirmation as to whether the apparatus setting and the network setting have been completed.

A computer-readable recording medium recorded with an apparatus control program according to yet another aspect of the invention is a computer-readable recording medium recorded with an apparatus control program for controlling an apparatus control device to control an apparatus which is communicatively connected to a server via a network, and which requires a plurality of different settings. The apparatus control program causes a computer to function as: an apparatus setting section for accepting an input by a first operator, and performing a setting, the setting being at least one of a setting on a connection between the apparatus and the apparatus controlling device, and a confirmation on an operation of the apparatus including a test run of the apparatus using the apparatus controlling device; a network setting section for accepting an input by a second operator different from the first operator, and performing a setting on a connection between the apparatus controlling device and the server; a setting status monitoring section for monitoring an apparatus setting status representing whether the setting by the apparatus setting section has been completed, and a network setting status representing whether the setting by the network setting section has been completed; and a setting status display section for displaying the apparatus setting status and the network setting status detected by the setting status monitoring section.

In the above arrangement, the apparatus setting section accepts an input by a first operator, and performs the at least one of the connection setting between the apparatus and the apparatus controlling device, and the operation confirmation including the test run of the apparatus using the apparatus controlling device. The network setting section accepts an input by a second operator different from the first operator, and performs the connection setting between the apparatus controlling device and the server. The setting status monitoring section monitors the apparatus setting status representing whether the setting by the apparatus setting section has been completed, and the network setting status representing whether the setting by the network setting section has been completed. The setting status display section displays the apparatus setting status and the network setting status detected by the setting status monitoring section.

With the above arrangement, if the apparatus setting and the network setting are performed by different operators, the setting statuses as to whether the settings to be executed by the respective operators have been completed are displayed, thereby enabling the respective operators to perform the setting operations independently and efficiently.

A computer-readable recording medium recorded with an apparatus control program according to still another aspect of the invention is a computer-readable recording medium recorded with an apparatus control program for controlling an apparatus which is communicatively connected to a server via a network and which requires a plurality of different settings. The apparatus control program causes a computer to function as: an apparatus setting section for accepting an input by a first operator, and performing setting, the setting being at least one of a setting on an operation of the apparatus, and a confirmation on the operation of the apparatus including a test run of the apparatus; a network setting section for accepting an input by a second operator different from the first operator, and performing a setting on a connection between the apparatus and the server; a setting status monitoring section for monitoring an apparatus setting status representing whether the setting by the apparatus setting section has been completed, and a network setting status representing whether the setting by the network setting section has been completed; and a setting status display section for displaying the apparatus setting status and the network setting status detected by the setting status monitoring section.

In the above arrangement, the apparatus setting section accepts an input by a first operator, and performs the at least one of the operation setting, and the operation confirmation including the test run of the apparatus. The network setting section accepts an input by a second operator different from the first operator, and performs the connection setting between the apparatus and the server. The setting status monitoring means monitors the apparatus setting status representing whether the setting by the apparatus setting section has been completed, and the network setting status representing whether the setting by the network setting section has been completed. The setting status display section displays the apparatus setting status and the network setting status detected by the setting status monitoring section.

With the above arrangement, if the apparatus setting and the network setting are performed by different operators, the setting statuses as to whether the settings to be executed by the respective operators have been completed are displayed, thereby enabling the respective operators to perform the setting operations independently and efficiently.

With use of the computer-readable recording medium recorded with the apparatus control program, at least a part of the apparatus control system of the invention can be easily realized by cooperative operations of hard resources such as an electric/information apparatus, a computer, and a server. Also, distribution/update of the program, and an installation operation of the program can be facilitated by recording the program in a recording medium or by delivering the program using a communications line.

As mentioned above, in the case where the apparatus setting and the network setting are performed by different operators, the apparatus control system and the computer-readable recording medium recorded with the apparatus control program according to the invention are operative to display the setting statuses as to whether the settings to be executed by the different operators have been completed. This arrangement enables the respective operators to perform the setting operations independently and efficiently. Thus, the invention is useful as an apparatus requiring plural different settings, an apparatus controlling device for controlling the apparatus, an apparatus control system constructed such that the apparatus controlling device and a server are connected via a network, a computer-readable recording medium recorded with an apparatus control program, and the like.

Also, in the case where the apparatus setting and the network setting are performed by different operators, the apparatus, and the computer-readable recording medium recorded with the apparatus control program according to the invention are operative to display the setting statuses as to whether the settings to be executed by the different operators have been completed. This arrangement enables the respective operators to perform the setting operations independently and efficiently. Thus, the invention is useful as an apparatus which is communicatively connected to a server via a network, and requires plural different settings, a computer-readable recording medium recorded with an apparatus control program, and the like.

These arrangements are applicable to a system requiring a connection work by a professional worker, such as a photovoltaic power system and a fuel cell system using a gas or a large amount of power. Also, the invention is applicable to a network-connectable remote control system.

The invention claimed is:

1. An apparatus control system comprising an apparatus which requires a plurality of different settings, an apparatus controlling device for controlling the apparatus, and a server which is communicatively connected to the apparatus controlling device via a network, wherein
the apparatus controlling device includes:
an apparatus setting section for accepting an input by a first operator, and performing a setting, the setting being at least one of a setting on a connection between the apparatus and the apparatus controlling device, and a confirmation on an operation of the apparatus including a test run of the apparatus using the apparatus controlling device;
a network setting section for accepting an input by a second operator different from the first operator, and performing a setting on a connection between the apparatus controlling device and the server;
a setting status monitoring section for monitoring an apparatus setting status representing whether the setting by the apparatus setting section has been performed, and a network setting status representing whether the setting by the network setting section has been performed; and
a setting status display section for displaying the apparatus setting status and the network setting status detected by the setting status monitoring section; and
a setting status information transmitting section for transmitting, to the server, information relating to the apparatus setting status and the network setting status monitored by the setting status monitoring section,
wherein the server includes a setting status information receiving section for receiving the information relating to the apparatus setting status and the network setting status transmitted by the setting status information transmitting section,
the setting status monitoring section stores the information relating to the apparatus setting status and the network setting status,
the setting status information transmitting section judges whether the setting by the network setting section has been performed, and responsive to judging that the setting by the network setting section has been performed, the setting status information transmitting section transmits, to the server, the information relating to the apparatus setting status and the network setting status stored in the setting status monitoring section, and
the setting status information transmitting section judges whether the setting by the apparatus setting section has been performed, and responsive to judging that the setting by the apparatus setting section has been performed, the setting status information transmitting section transmits, to the server, the information relating to the apparatus setting status and the network setting status stored in the setting status monitoring section.

2. The apparatus control system according to claim 1, wherein
the setting status display section displays the apparatus setting status and the network setting status monitored by the setting status monitoring section when a power is supplied to the apparatus controlling device.

3. The apparatus control system according to claim 1, wherein
the setting status display section displays the apparatus setting status and the network setting status monitored by the setting status monitoring section after completion of at least one of the setting by the apparatus setting section and the setting by the network setting section.

4. The apparatus control system according to claim 1, wherein
the apparatus setting section performs the connection setting so that a control signal for controlling the apparatus is transmittable, and a response signal to be sent from the apparatus is receivable, and
the network setting section performs the connection setting so that the server is identified on the network, and the apparatus controlling device is communicatively connected to the server.

5. An apparatus which is communicatively connected to a server via a network, and requires a plurality of different settings, the apparatus comprising:
an apparatus setting section for accepting an input by a first operator, and performing a setting, the setting being at least one of a setting on an operation of the apparatus, and a confirmation on the operation of the apparatus including a test run of the apparatus;
a network setting section for accepting an input by a second operator different from the first operator, and performing a setting on a connection between the apparatus and the server;
a setting status monitoring and storing section for monitoring an apparatus setting status representing whether the setting by the apparatus setting section has been performed, and a network setting status representing whether the setting by the network setting section has been performed;
a setting status display section for displaying the apparatus setting status and the network setting status detected by the setting status monitoring section; and
a setting status information transmitting section for transmitting, to the server, information relating to the apparatus setting status and the network setting status monitored by the setting status monitoring section,
wherein the setting status information transmitting section judges whether the setting by the network setting section has been performed, and responsive to judging that the setting by the network setting section has been performed, the setting status information transmitting section transmits, to the server, the information relating to the apparatus setting status and the network setting status stored in the setting status monitoring section, and
the setting status information transmitting section judges whether the setting by the apparatus setting section has been performed, and responsive to judging that the setting by the apparatus setting section has been performed, the setting status information transmitting section transmits, to the server, the information relating to the apparatus setting status and the network setting status stored in the setting status monitoring section.

6. The apparatus according to claim 5, wherein
the setting status display section displays the apparatus setting status and the network setting status detected by the setting status monitoring section when a power is supplied to the apparatus.

7. The apparatus according to claim 5, wherein
the setting status display section displays the apparatus setting status and the network setting status detected by the setting status monitoring section after completion of at least one of the setting by the apparatus setting section and the setting by the network setting section.

8. A non-transitory computer-readable recording medium recording thereon an apparatus control program for controlling an apparatus control device to control an apparatus which is communicatively connected to a server via a network, and which requires a plurality of different settings, the apparatus control program causing a computer to function as the following:
an apparatus setting section for accepting an input by a first operator, and performing a setting, the setting being at least one of a setting on a connection between the apparatus and the apparatus controlling device, and a confirmation on an operation of the apparatus including a test run of the apparatus using the apparatus controlling device;
a network setting section for accepting an input by a second operator different from the first operator, and performing a setting on a connection between the apparatus controlling device and the server;
a setting status monitoring section for monitoring and storing an apparatus setting status representing whether the setting by the apparatus setting section has been performed, and a network setting status representing whether the setting by the network setting section has been performed; and
a setting status display section for displaying the apparatus setting status and the network setting status detected by the setting status monitoring section; and
a setting status information transmitting section for transmitting, to the server, information relating to the apparatus setting status and the network setting status monitored by the setting status monitoring section,
wherein the setting status information transmitting section judges whether the setting by the network setting section has been performed, and responsive to judging that the setting by the network setting section has been performed, the setting status information transmitting section transmits, to the server, the information relating to the apparatus setting status and the network setting status stored in the setting status monitoring section, and
the setting status information transmitting section judges whether the setting by the apparatus setting section has been performed, and responsive to judging that the setting by the apparatus setting section has been performed, the setting status information transmitting section transmits, to the server, the information relating to the apparatus setting status and the network setting status stored in the setting status monitoring section.

9. A non-transitory computer-readable recording medium recording thereon an apparatus control program for controlling an apparatus which is communicatively connected to a server via a network and which requires a plurality of different settings, the apparatus control program causing a computer to function as the following:
an apparatus setting section for accepting an input by a first operator, and performing a setting, the setting being at least one of a setting on an operation of the apparatus, and a confirmation on the operation of the apparatus including a test run of the apparatus;
a network setting section for accepting an input by a second operator different from the first operator, and performing a setting on a connection between the apparatus and the server;
a setting status monitoring section for monitoring and storing an apparatus setting status representing whether the setting by the apparatus setting section has been performed, and a network setting status representing whether the setting by the network setting section has been performed; and
a setting status display section for displaying the apparatus setting status and the network setting status detected by the setting status monitoring section; and
a setting status information transmitting section for transmitting, to the server, information relating to the apparatus setting status and the network setting status monitored by the setting status monitoring section,
wherein the setting status information transmitting section judges whether the setting by the network setting section has been performed, and responsive to judging that the setting by the network setting section has been performed, the setting status information transmitting section transmits, to the server, the information relating to the apparatus setting status and the network setting status stored in the setting status monitoring section, and
the setting status information transmitting section judges whether the setting by the apparatus setting section has been performed, and responsive to judging that the setting by the apparatus setting section has been performed, the setting status information transmitting section transmits, to the server, the information relating to the apparatus setting status and the network setting status stored in the setting status monitoring section.

* * * * *